(12) United States Patent
Chai et al.

(10) Patent No.: US 11,580,319 B2
(45) Date of Patent: Feb. 14, 2023

(54) DISPLAY APPARATUS

(71) Applicant: Samsung Display Co., Ltd., Yongin-si (KR)

(72) Inventors: Yoonjung Chai, Yongin-si (KR); Wonjun Lee, Yongin-si (KR); Cholho Kim, Yongin-si (KR); Hongbo Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/884,813

(22) Filed: May 27, 2020

(65) Prior Publication Data

US 2020/0394371 A1 Dec. 17, 2020

(30) Foreign Application Priority Data

Jun. 13, 2019 (KR) .......................... 10-2019-0070069

(51) Int. Cl.
*G06K 7/10* (2006.01)
*G06F 3/041* (2006.01)

(52) U.S. Cl.
CPC ....... *G06K 7/10564* (2013.01); *G06F 3/0416* (2013.01)

(58) Field of Classification Search
CPC .......................... G06K 7/10564; G06F 3/0416
See application file for complete search history.

(56) References Cited

U.S. PATENT DOCUMENTS

| 10,268,884 B2 | 4/2019 | Jones et al. | |
|---|---|---|---|
| 2010/0067757 A1* | 3/2010 | Arai | G06K 9/0004 382/128 |
| 2016/0035940 A1* | 2/2016 | Fujita | G06V 40/1324 438/29 |
| 2017/0351898 A1 | 12/2017 | Zhang | |
| 2018/0012069 A1 | 1/2018 | Chung et al. | |
| 2018/0075278 A1 | 3/2018 | Zhang | |
| 2018/0130857 A1 | 5/2018 | Lee et al. | |
| 2019/0034020 A1 | 1/2019 | He et al. | |
| 2019/0157337 A1* | 5/2019 | Lin | H01L 31/167 |
| 2019/0272057 A1* | 9/2019 | Chen | G06F 3/0416 |
| 2020/0380236 A1* | 12/2020 | He | G06F 3/044 |

FOREIGN PATENT DOCUMENTS

| KR | 10-2018-0005588 | 1/2018 |
|---|---|---|
| KR | 10-2018-0051692 | 5/2018 |
| KR | 10-2018-0100140 | 9/2018 |
| KR | 10-1915121 | 11/2018 |

* cited by examiner

*Primary Examiner* — Laura A Gudorf
(74) *Attorney, Agent, or Firm* — Kile Park Reed & Houtteman PLLC

(57) ABSTRACT

A display apparatus includes a sensor layer including sensors; a pixel layer disposed on the sensor layer and including pixel areas and pixels in the pixel areas; and an opaque layer disposed between the sensor layer and the pixel layer and having holes corresponding to light-transmitting areas of pixel areas in which pixels that emit light of a specific color are disposed.

21 Claims, 24 Drawing Sheets

DISPLAY APPARATUS

CROSS-REFERENCE TO RELATED APPLICATIONS

This application claims priority to and benefits of Korean Patent Application No. 10-2019-0070069 under 35 U.S.C. § 119, filed in the Korean Intellectual Property Office on Jun. 13, 2019, the entire contents of which are incorporated herein by reference.

BACKGROUND

1. Technical Field

One or more embodiments relate to a display apparatus having a fingerprint sensing function.

2. Description of the Related Art

Various display apparatuses used in multimedia devices such as a television, a mobile phone, a tablet computer, a navigation system, and a game console have been developed. Recently, display apparatuses having functions for sensing user fingerprints have been developed. Examples of fingerprint recognition methods include an electrostatic capacitive method based on a change in the capacitance of a capacitor formed between electrodes, an optical method using an optical sensor, and an ultrasonic method using a piezoelectric material.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

One or more embodiments may include a display apparatus for configuring a fingerprint sensor without a separate external light source and increasing the amount of light received by a sensor.

Technical problems to be solved by the disclosure are not limited to the above, and other technical problems solved by the disclosure will be clearly appreciated and understood by one of ordinary skill in the art from the description of the disclosure.

Additional aspects will be set forth in part in the description which follows and, in part, will be apparent from the description, or may be learned by practice of the presented embodiments of the disclosure.

According to one or more embodiments, a display apparatus may include a sensor layer including a plurality of sensors; a pixel layer disposed on the sensor layer and including a plurality of pixel areas and a plurality of pixels in the pixel areas; and an opaque layer disposed between the sensor layer and the pixel layer and including holes corresponding to light-transmitting areas of pixel areas in which pixels that emit light of a specific color are disposed.

The holes of the opaque layer may be repeatedly formed in a predetermined pattern and in a predetermined direction in a display area.

The light-transmitting area may be an area corresponding to a gap between wirings and circuit devices constituting a pixel in a pixel area where the pixel is disposed.

Each of the plurality of pixels may include a pixel circuit disposed in the pixel area and a pixel electrode connected to the pixel circuit, wherein the display apparatus may further include an insulating layer including openings exposing a part of each of the plurality of pixel electrodes and covering edges of the plurality of the pixel electrodes.

The openings of the insulating layer may be offset from the holes of the opaque layer.

The pixels that emit the light of the specific color may be any one of red pixels, green pixels and blue pixels.

The display apparatus may further include a substrate between the opaque layer and the sensor layer.

The display apparatus may include a substrate having a plurality of layers and the opaque layer may be disposed between the plurality of layers of the substrate.

The opaque layer may be a single-layer structure including molybdenum (MO).

The opaque layer may be a sequentially stacked three-layer structure including a first layer having titanium (Ti), a second layer having aluminum (Al), and a third layer having titanium (Ti).

The pixel layer may include a circuit layer including pixel circuits of the plurality of pixels; and a display element layer disposed on the pixel circuit layer and including display elements of the plurality of pixels, wherein the opaque layer may be disposed between the substrate and the circuit layer.

The pixels may include first, second, and third pixels, including first, second, and third emission areas, respectively. The first emission areas of the first pixels and the third emission areas of the third pixels may be alternately arranged in a first direction in a first sub-row of each of rows, and the second emission areas of the second pixels may be repeatedly arranged in the first direction in a second sub-row and repeatedly arranged in a zigzag pattern.

The holes may be offset from the first, second, and third emission areas.

According to one or more embodiments, a display apparatus may include a substrate including a plurality of pixel areas in a display area; an opaque layer disposed on the substrate; and a plurality of pixels disposed on the opaque layer and respectively disposed in the plurality of pixel areas, wherein the opaque layer may have holes corresponding to light-transmitting areas of pixel areas in which pixels that emit light of a specific color are disposed.

Each of the light-transmitting areas may be an area corresponding to a gap between wirings and circuit devices constituting the pixel in each of the plurality of pixel areas.

The plurality of pixels may include first pixels that emit red light, second pixels that emit green light, and third pixels that emit blue light.

The opaque layer may include holes respectively corresponding to light-transmitting areas of one of the first pixel areas, the second pixel areas and the third pixel areas.

The openings of the insulating layer may be offset from the holes of the opaque layer.

The display apparatus may further include a plurality of sensors disposed on a surface of the substrate opposite to a surface on which the plurality of pixels are disposed, and in a sensing area overlapping at least a part of the display area.

Each of the plurality of sensors may overlap at least one pixel in the sensing area Each of the plurality of sensors may be disposed in a non-emitting area between adjacent pixels and offset from the pixels.

BRIEF DESCRIPTION OF THE DRAWINGS

The above and other aspects, features, and advantages of embodiments of the disclosure will be more apparent from the following description taken in conjunction with the accompanying drawings, in which.

DETAILED DESCRIPTION OF THE EMBODIMENTS

Figure 1:
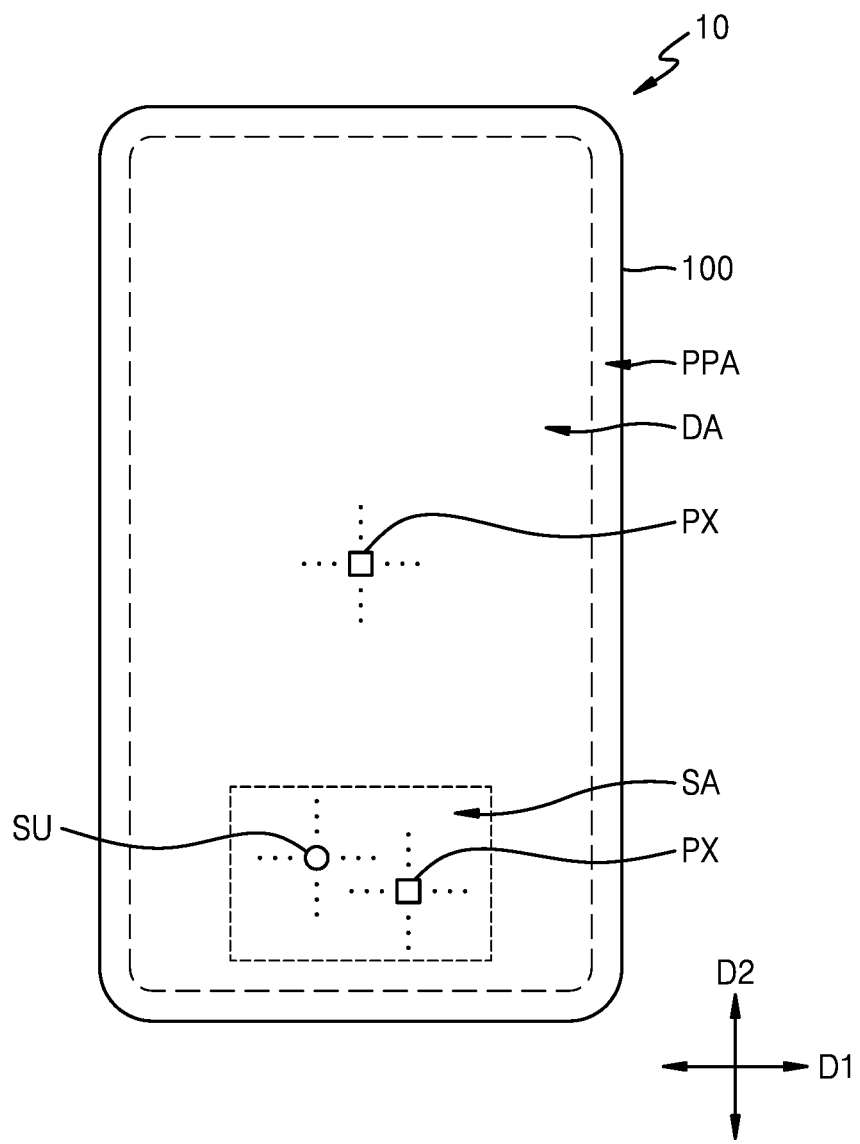
FIGS. 1 and 2 are plan views illustrating a display apparatus according to an embodiment of the disclosure.

Although the invention may be modified in various manners and have additional embodiments, embodiments are illustrated in the accompanying drawings and will be mainly described in the specification. However, the scope of the invention is not limited to the embodiments in the accompanying drawings and the specification and should be construed as including all the changes, equivalents and substitutions included in the spirit and scope of the invention.

Some of the parts which are not associated with the description may not be provided in order to describe embodiments of the invention and like reference numerals refer to like elements throughout the specification.

It will be understood that, although the terms "first," "second," "third," or the like may be used herein to describe various elements, these elements should not be limited by these terms. These terms are used to distinguish one element from another element or for the convenience of description and explanation thereof. For example, when "a first element" is discussed in the description, it may be termed "a second element" or "a third element," and "a second element" and "a third element" may be termed in a similar manner without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 5% of the stated value.

As used herein, the singular forms "a", "an", and "the" are intended to include the plural forms as well, unless the context clearly indicates otherwise.

Throughout the specification, when an element is referred to as being "connected" to another element, the element may be "directly connected" to another element, or "electrically connected" to another element with one or more intervening elements interposed therebetween. It will be further understood that when the terms "comprises," "comprising," "includes" and/or "including" are used in this specification, they or it may specify the presence of stated features, integers, steps, operations, elements and/or components, but do not preclude the presence or addition of other features, integers, steps, operations, elements, components, and/or any combination thereof.

When a layer, film, region, substrate, or area, is referred to as being "on" another layer, film, region, substrate, or area, it may be directly on the other film, region, substrate, or area, or intervening films, regions, substrates, or areas, may be present therebetween. Conversely, when a layer, film, region, substrate, or area, is referred to as being "directly on" another layer, film, region, substrate, or area, intervening layers, films, regions, substrates, or areas, may be absent therebetween. Further when a layer, film, region, substrate, or area, is referred to as being "below" another layer, film, region, substrate, or area, it may be directly below the other layer, film, region, substrate, or area, or intervening layers, films, regions, substrates, or areas, may be present therebetween. Conversely, when a layer, film, region, substrate, or area, is referred to as being "directly below" another layer, film, region, substrate, or area, intervening layers, films, regions, substrates, or areas, may be absent therebetween. Further, "over" or "on" may include positioning on or below an object and does not necessarily imply a direction based upon gravity.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

Throughout the specification, when an element is referred to as being "connected" to another element, the element may be "directly connected" to another element, or "electrically connected" to another element with one or more intervening elements interposed therebetween. It will be further understood that when the terms "comprises," "comprising," "includes" and/or "including" are used in this specification, they or it may specify the presence of stated features, integers, steps, operations, elements and/or components, but do not preclude the presence or addition of other features, integers, steps, operations, elements, components, and/or any combination thereof.

In the drawings, sizes and thicknesses of elements may be enlarged for clarity and ease of description thereof. However, the invention is not limited to the illustrated sizes and thicknesses. In the drawings, the thicknesses of layers, films, panels, regions, and other elements may be exaggerated for clarity. In the drawings, for better understanding and ease of description, the thicknesses of some layers and areas may be exaggerated.

In the following embodiments, "a plan view of an object" refers to "a view of an object as viewed from above, and "a cross-sectional view of an object" refers to "a view of an object vertically cut and as viewed from the side. In the following embodiments, when elements "overlap", it may mean that the elements overlap in a "plan view" and/or a "cross-sectional view".

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

The disclosure will now be described more fully with reference to the accompanying drawings, in which embodiments of the disclosure are shown.

Figure 2:
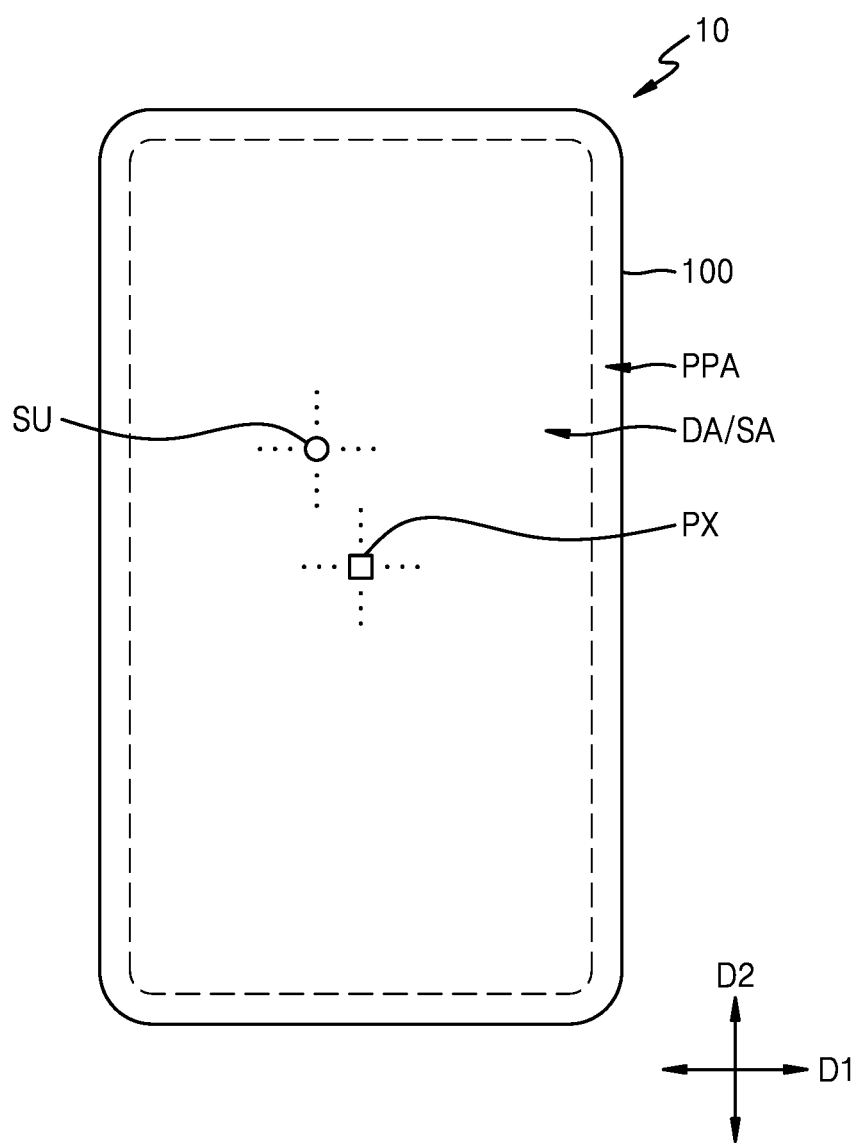

FIGS. 1 and 2 are plan views illustrating a display apparatus according to an embodiment of the disclosure.

Although an organic light-emitting display apparatus is described as a display apparatus according to an embodiment of the disclosure, the display apparatus of the disclosure is not limited thereto. In an embodiment, the display apparatus of the disclosure may be any of various display apparatuses such as an inorganic light-emitting display (or an inorganic electroluminescent (EL) display) a nano light-emitting display, or a quantum dot light-emitting display.

Referring to FIG. 1, the display apparatus according to an embodiment includes a display area DA where an image is displayed and a peripheral area PPA that is a non-display area and around the display area DA. A substrate 100 of a display panel 10 of the display apparatus may include the display area DA and the peripheral area PPA.

The display area DA may have a shape similar to a rectangular shape or a square shape. The display area DA may have a shape having round corners. Pixels PX and wirings for applying an electrical signal to the pixels PX may be located or disposed in the display area DA. The pixels PX may be arranged in a predetermined pattern in a first direction D1 and a second direction D2 that intersects the first direction D1. Each of the pixels PX may include a display element and a pixel circuit for driving the display element. For example, the display element may include an organic light-emitting diode (OLED), an inorganic LED, a mini-LED, a nano-emitting diode (NED), or a quantum dot (QD)-LED. The pixel circuit may include transistors and a capacitor.

Signal lines for applying an electrical signal to the pixels PX may include scan lines and data lines. Each of the scan lines may extend in the first direction D1, and each of the data lines may extend in the second direction D2. The scan lines may be arranged in rows and may transmit a scan signal to the pixels PX, and the data lines may be arranged in columns and may transmit a data signal to the pixels PX. Each of the pixels PX may be connected to at least one corresponding scan line from among the scan lines and at least one corresponding data line from among the data lines.

The display area DA may include a sensing area SA. The display area DA and the sensing area SA may overlap each other, and at least a part of the display area DA may be set to the sensing area SA. The term overlap may include layer, stack, face or facing, extending over, covering or partly covering or any other suitable term as would be appreciated and understood by those of ordinary skill in the art. The terms 'do not overlap' may include 'apart from' or 'set aside from' or 'offset from' and any other suitable equivalents as would be appreciated and understood by those of ordinary skill in the art.

As shown in FIG. 1, a part of the display area DA may be set to the sensing area SA, or only a part of the display area DA may be set to the sensing area SA. In an embodiment, as shown in FIG. 2, the entire display area DA may be set to the sensing area SA. In an embodiment, the display area DA and the sensing area SA may be located or disposed substantially adjacent to each other so that some parts of the display area DA and the sensing area SA may overlap each other, or only parts of the display area DA and the sensing area SA may overlap each other. The pixels PX and sensors SU may be located or disposed in the sensing area SA. Each of the sensors SU may be a sensor for sensing biometric information of a human body related to at least one of, for example, a user's heartbeat, stress, fingerprint, oxygen saturation, blood pressure, blood sugar level, temperature and skin color. The following will be described assuming that the sensor SU senses a fingerprint. The sensor SU may be an optical sensor including a light-receiving device.

The sensors SU may be provided on a surface (e.g., a rear surface) opposite to a surface (e.g., a front surface) of the display panel 10 on which an image is displayed from among both surfaces of the display panel 10. The sensors SU may use a display element of at least one pixel PX located or disposed substantially around the sensors SU as a light source. The sensors SU, for example, may overlap at least some of the pixels PX located or disposed in the sensing area SA or may be located or disposed around the pixels PX. For example, at least some of the sensors SU may be located or disposed to overlap a non-emitting area between adjacent pixels PX located or disposed in the sensing area SA. The pixels PX and the sensors SU may be arranged at a predetermined ratio according to a sensing resolution. For example, a resolution of the sensors SU may be less than a resolution of the pixels PX.

The peripheral area PPA where an image is not displayed may surround the display area DA. The peripheral area PPA where the pixels PX may not be located or disposed may include a pad area to which various electronic devices, for example, a printed circuit board, may be electrically attached.

A driver for applying an electrical signal to the pixels PX of the display area DA may be located or disposed in the peripheral area PPA. The driver may be formed as a separate integrated circuit chip or one integrated circuit chip and may be directly mounted on the peripheral area PPA, may be mounted on a flexible printed circuit film, may be attached as a tape carrier package (TCP) to the substrate 100, or may be directly formed on the substrate 100. The peripheral area PPA may include power supply lines that supply power such as a driving voltage and a common voltage.

Although not shown in FIGS. 1 and 2, the display panel 10 may include a bending area that is a portion of the peripheral area PPA, and may be bent at the bending area.

FIGS. 3A through 3H are plan views illustrating sizes and/or an arrangement of pixels and sensors according to an embodiment of the disclosure. Resolution may be a function of the ratio and arrangement of sensors SU to pixels. In FIGS. 3A through 3H, an arrangement of the pixels PX may correspond to an arrangement of pixel areas where the pixels PX are located or disposed or emission areas where the display elements of the pixels PX are located or disposed.

Figure 3A:
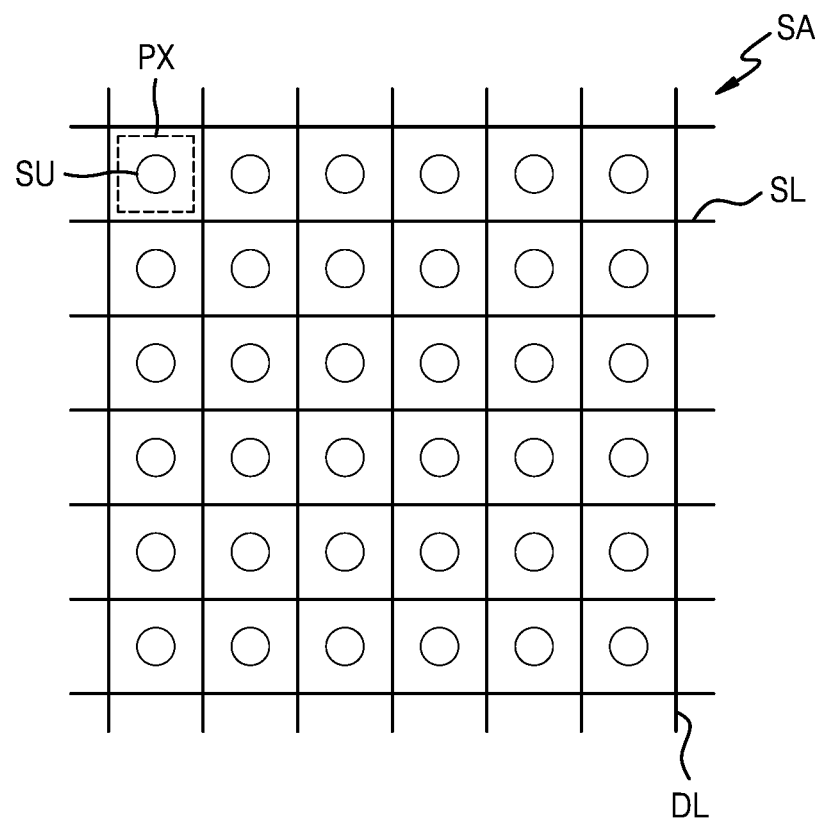
FIGS. 3A through 3H are plan views illustrating sizes and/or arrangements of pixels and sensors according to an embodiment of the disclosure.

Referring to FIG. 3A, the sensors SU in the sensing area SA may be located or disposed to have the same resolution as that of the pixels PX. For example, in the sensing area SA, the same number of sensors SU as the pixels PX may be provided. According to an embodiment, at least a portion of each of the sensors SU may overlap at least one pixel PX. For example, each of the sensors SU may be located or disposed in one pixel area where one pixel PX may be located or disposed.

Pixel areas may be substantially adjacent to each other as shown in FIG. 3A, or may be spaced apart from each other as shown in FIGS. 3B through 3H. The pixel areas may be divided by a scan line SL and a data line DL as illustrated in FIG. 3A. Although the scan line SL and the data line DL are not shown in FIGS. 3B through 3H, the scan line SL and the data line DL may be located or disposed in each pixel area.

Figure 3B:
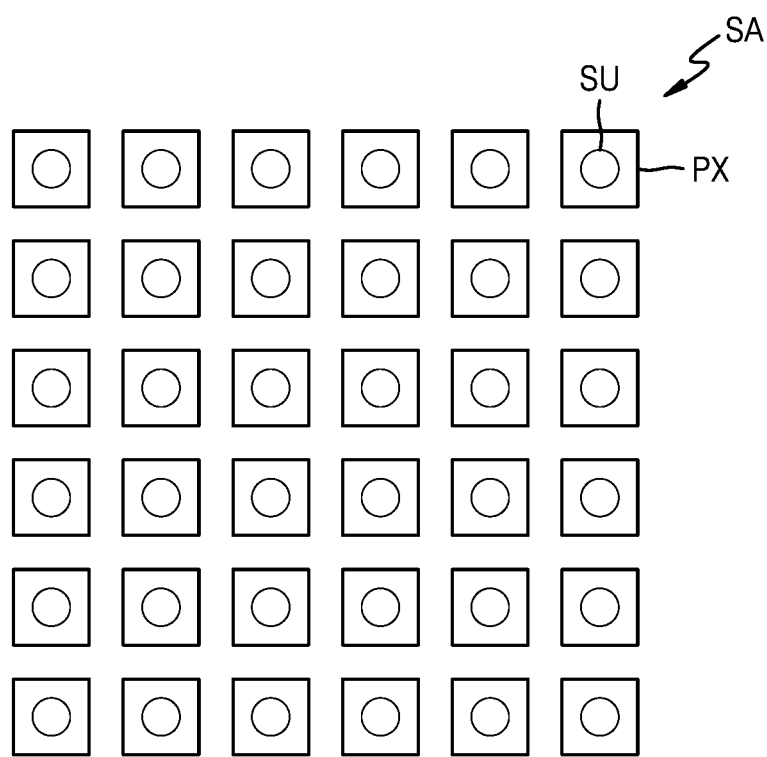

Referring to FIG. 3B, the pixels PX may be spaced apart from one another, and the sensors SU may be located or disposed in the sensing area SA to have the same resolution as that of the pixels PX. For example, in the sensing area SA, the same number of sensors SU as the number of pixels PX may be provided. According to an embodiment, at least a portion of each of the sensors SU may overlap at least one pixel PX. For example, each of the sensors SU may be located or disposed in one pixel area.

Figure 3C:
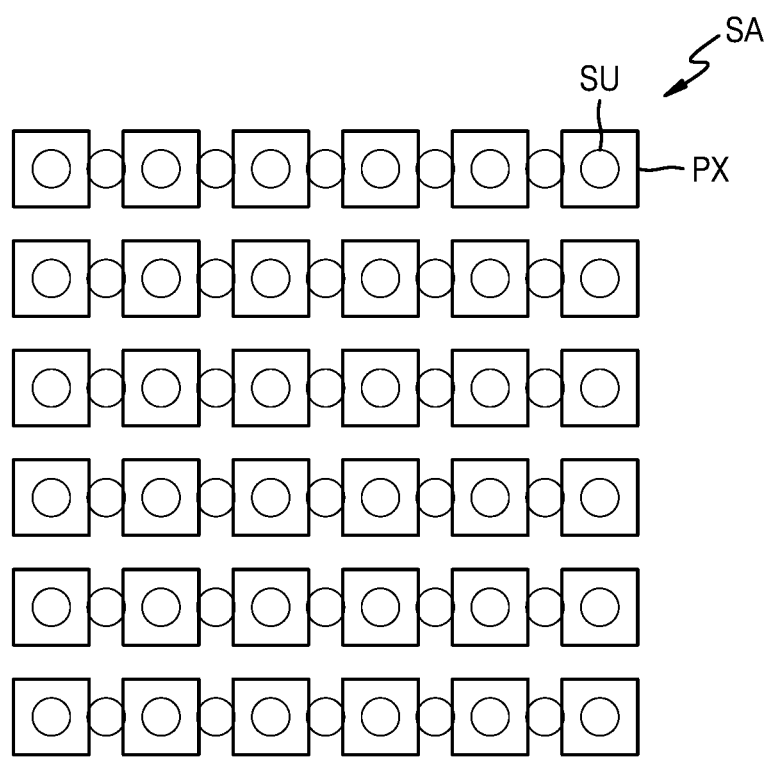

Referring to FIG. 3C, a greater number of sensors SU than the number of pixels PX provided in the sensing area SA may be provided and may be located or disposed in the sensing area SA to have a resolution greater than that of the pixels PX. For example, each of the sensors SU may have a size less than that of each of the pixels PX.

Figure 3D:
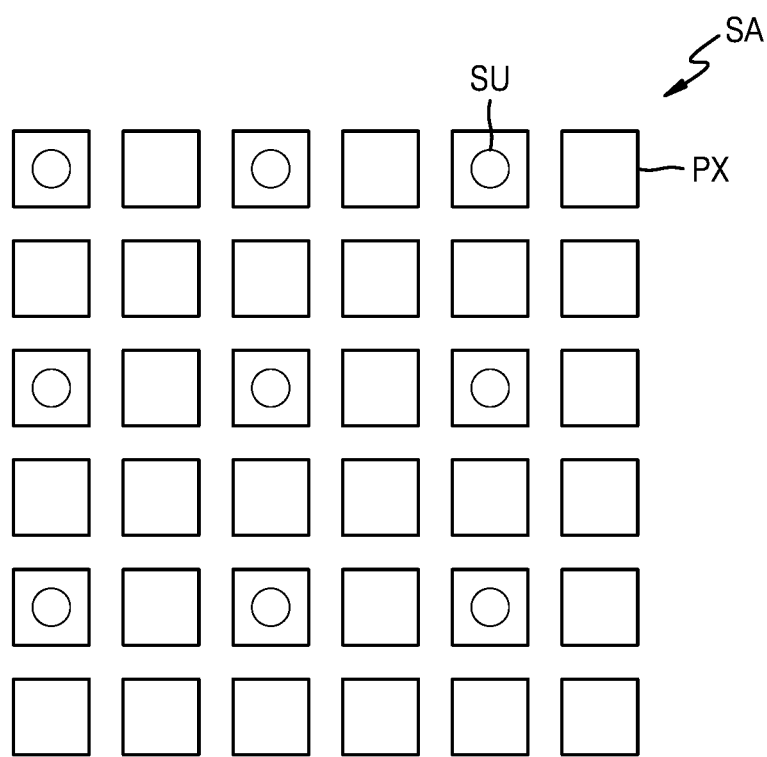

Referring to FIG. 3D, a smaller number of sensors SU, that is, fewer sensors SU than pixels PX may be provided and may be arranged at predetermined intervals in the sensing area SA. For example, the sensors SU may be located or disposed in areas where some pixels PX from among the pixels PX located or disposed in the sensing area SA may be formed. Although one sensor SU may be located or disposed for every four pixels PX located or disposed in the sensing area SA in FIG. 3D, the disclosure is not limited thereto. That is, the number (or a resolution) of sensors SU located or disposed in the sensing area SA may be modified in various ways.

Figure 3E:
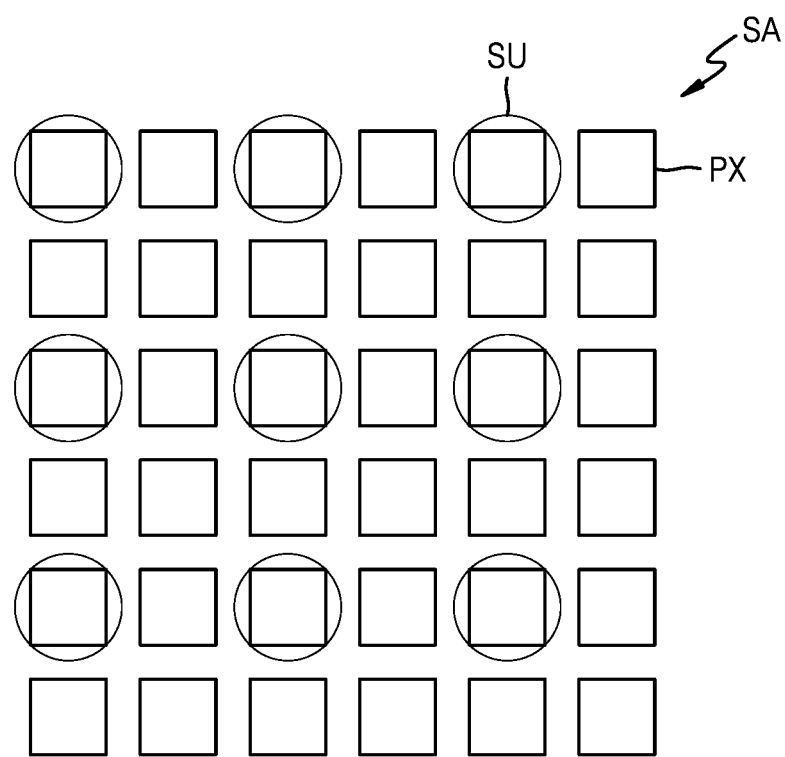

Referring to FIG. 3E, each of the sensors SU may have a size substantially greater than that of each of the pixels PX, and may be located or disposed to cover an area where the pixel PX corresponding to each of the sensors SU may be formed. For example, a smaller number of sensors SU, or fewer sensors SU than pixels PX may be provided and may be located or disposed at predetermined intervals in the sensing area SA.

Figure 3F:
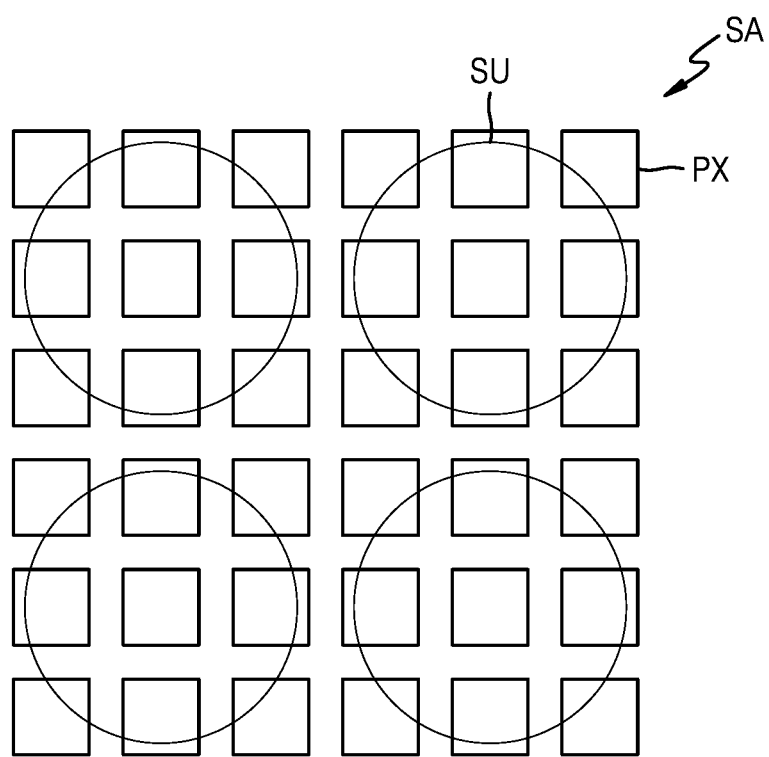

Referring to FIG. 3F, each of the sensors SU may have a size substantially large enough to cover pixels PX and may be located or disposed to overlap the pixels PX.

Figure 3G:
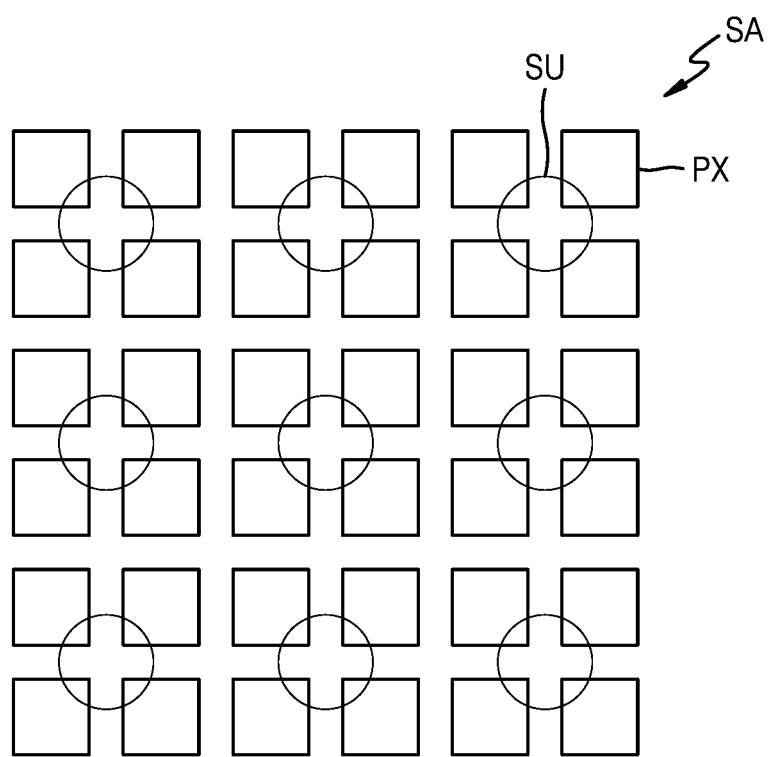

Referring to FIG. 3G, each of the sensors SU may be located or disposed in an area substantially between adjacent pixels PX and may be located or disposed so that at least a portion of the sensors SU overlaps adjacent pixels PX.

Figure 3H:
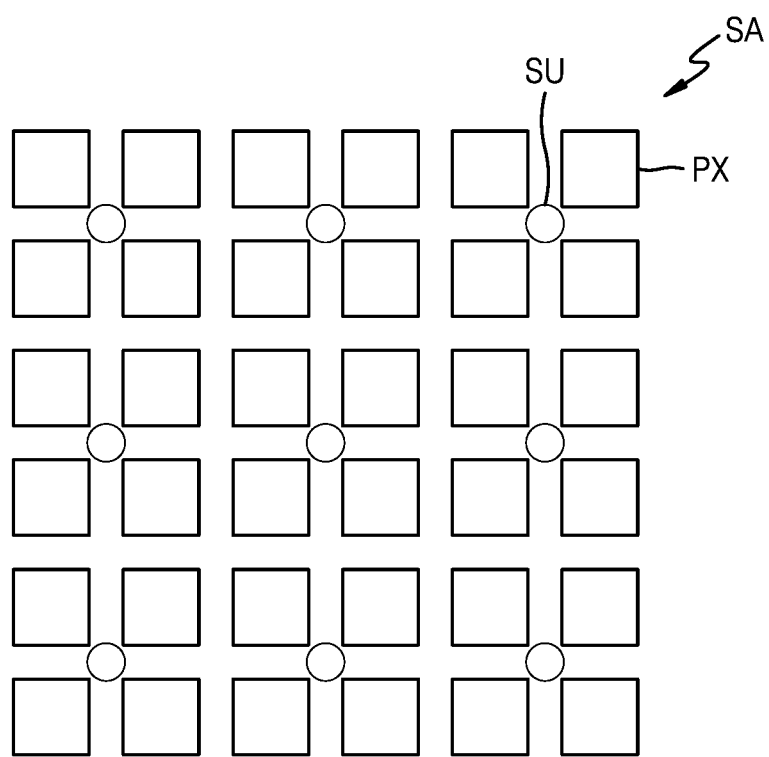

Referring to FIG. 3H, each of the sensors SU may be located or disposed in a non-emitting area substantially between adjacent pixels PX and may not overlap the pixels PX or be offset from the pixels PX.

Embodiments of the disclosure are not limited to the embodiments of FIGS. 3A through 3H, and sizes, numbers, resolutions, and positions, dispositions and or arrangements of the sensors SU located or disposed in the sensing area SA, and/or arrangements of the sensors SU with respect to the pixels PX may be modified in various ways. For example, sizes, numbers, resolutions, and positions of the sensors SU, and arrangements of the sensors SU with respect to the pixels PX may be determined considering various factors such as the amount of received light necessary to sense biometric information, resolution, and/or crosstalk.

Although the sensors SU may be arranged in a regular array in the sensing area SA in FIGS. 3A through 3H, the disclosure is not limited thereto. For example, in an embodiment of the disclosure, the sensors SU may be distributed irregularly in the sensing area SA.

Figure 4:
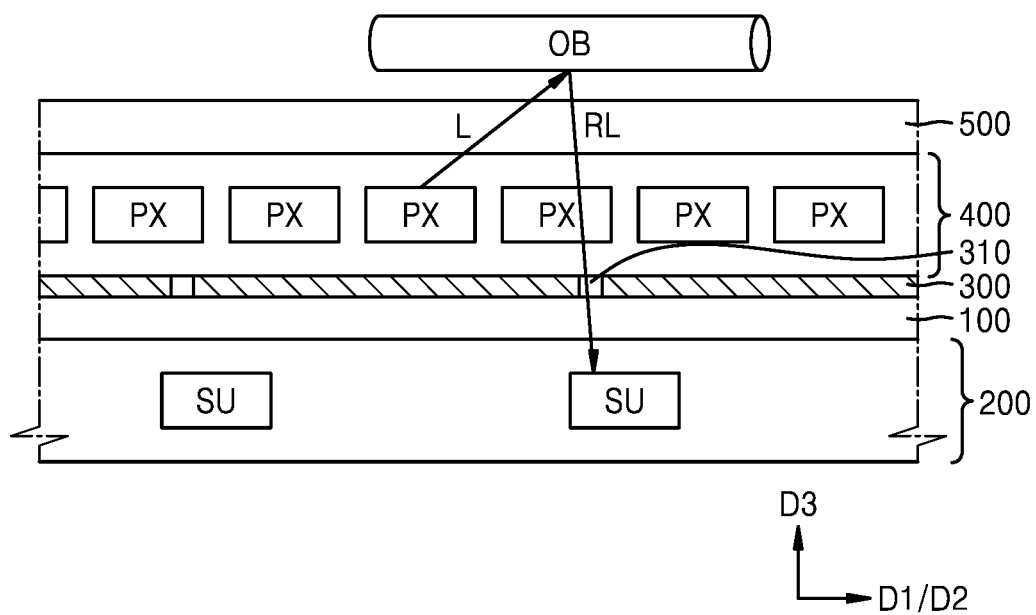
FIG. 4 is a view illustrating a configuration for sensing biometric information by using the display apparatus of FIG. 1.

FIG. 4 is a view illustrating a configuration for sensing biometric information by using the display apparatus of FIG. 1.

The display apparatus may include a sensor layer 200, an opaque layer 300, and a pixel layer 400. The pixel layer 400 may be located or disposed on a first surface (e.g., a front surface) of the substrate 100, and the sensor layer 200 may be located or disposed on a second surface (e.g., a rear surface) that is opposite to the first surface of the substrate 100. The opaque layer 300 may be located or disposed between the sensor layer 200 and the pixel layer 400. The opaque layer 300 may be located or disposed between the substrate 100 and the pixel layer 400. The display apparatus may include a functional layer 500 located or disposed on the pixel layer 400. The functional layer 500 may include one or more layers.

The sensor layer 200 may include sensors SU. The pixel layer 400 may include pixels PX and may include a circuit layer including pixel circuits of the pixels PX and a display element layer located or disposed on the circuit layer and including display elements. The opaque layer 300 may have holes 310. The holes 310 of the opaque layer 300 may correspond to a light-transmitting area of pixels that emit light of one specific color. Such pixels may be among the pixels PX that emit light of different colors.

When an object OB contacts or is adjacent to a top surface of the display apparatus, light L emitted from the pixels PX of the pixel layer 400 may be reflected by the object OB and reflected light RL may pass through the holes 310 of the opaque layer 300 and may be sensed by the sensors SU of the sensor layer 200. The object OB may be a body part such as a hand or a finger. The display apparatus may obtain biometric information based on a sensing signal from the sensors SU. The display apparatus may display the biometric information as an image by using the pixels PX.

Figure 5:
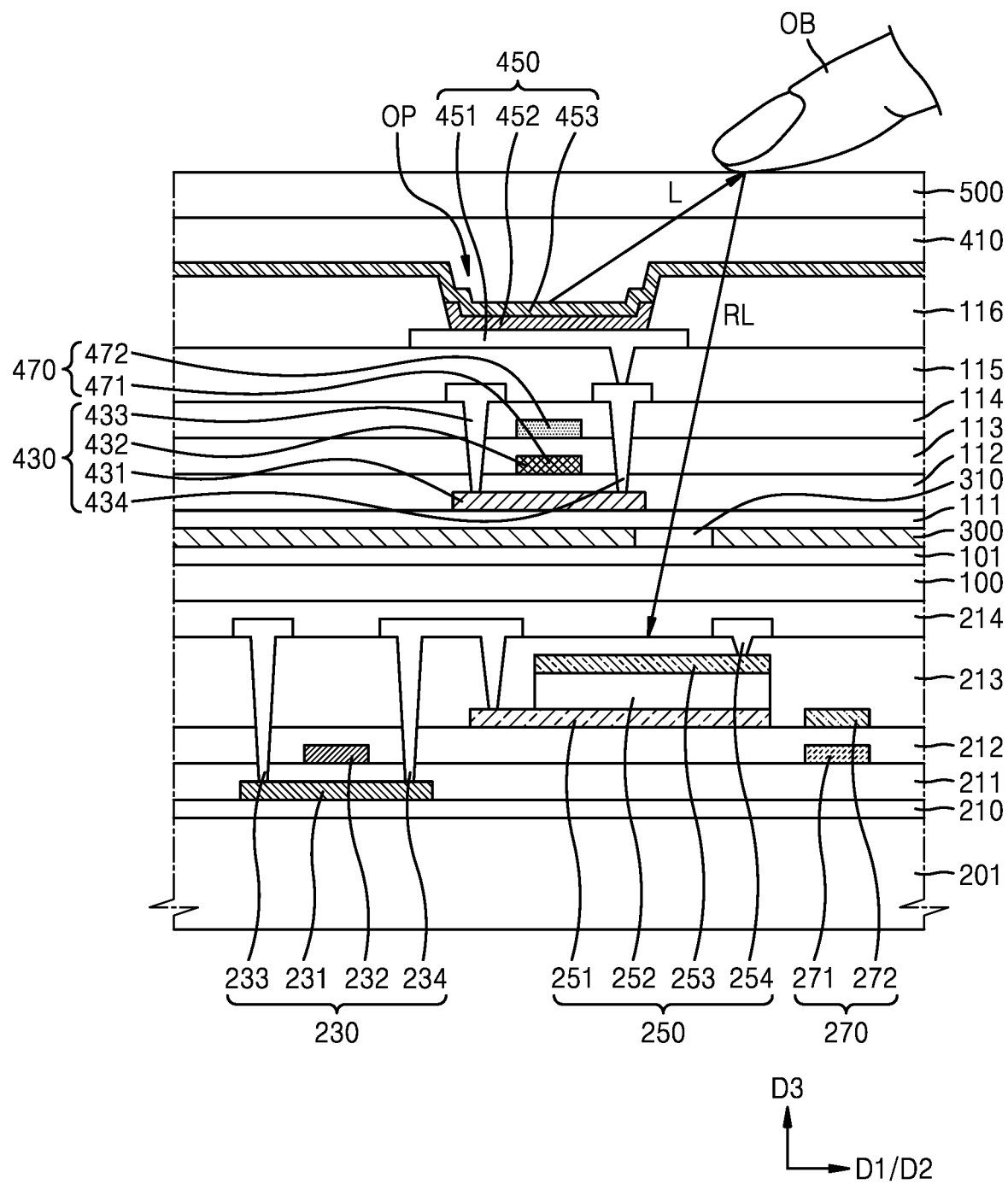
FIG. 5 is a schematic cross-sectional view illustrating a display apparatus according to an embodiment of the disclosure.

FIG. 5 is a schematic cross-sectional view illustrating a display apparatus according to an embodiment of the disclosure.

FIG. 5 is a schematic cross-sectional view illustrating a pixel and a sensor located or disposed in the sensing area SA overlapping the display area DA of the display panel 10. Referring to FIGS. 4 and 5, the opaque layer 300 and the pixel layer 400 may be provided on a front surface of the substrate 100.

The substrate 100 may be formed of any of various materials such as a glass material, a metal material, or a plastic material. According to an embodiment, the substrate 100 may be a flexible substrate and may include a polymer resin such as polyethersulfone (PES), polyacrylate, polyetherimide (PEI), polyethylene naphthalate (PEN), polyethylene terephthalate (PET), polyphenylene sulfide (PPS), polyarylate (PAR), polyimide (PI), polycarbonate (PC), or cellulose acetate propionate (CAP). The substrate 100 may include a plurality of layers. For example, the substrate 100 may have a multi-layer structure including a base layer including the above polymer resin and an inorganic layer. For example, the substrate 100 may include a first base layer, a first inorganic layer, a second base layer, and a second inorganic layer, which may be sequentially stacked. Each of the first and second base layers may include the above polymer resin. Each of the first and second inorganic layers that is a barrier layer that may prevent penetration of a foreign material may have a single or multi-layer structure including an inorganic material such as silicon nitride ($SiN_x$) and/or silicon oxide ($SiO_x$).

A buffer layer 101 may be located or disposed on the substrate 100. The buffer layer 101 may include an inorganic material, such as silicon nitride or silicon oxide, an organic material, or a combination of an organic material and an inorganic material, and may have a single or multi-layer structure including an inorganic material and an organic material. In some embodiments, the second inorganic material of the substrate 100 may be a part of the buffer layer 101 having a multi-layer structure. The buffer layer 101 may be omitted. The opaque layer 300 may be located or disposed on the buffer layer 101.

The opaque layer 300 may be located or disposed to correspond to at least the sensing area SA. The opaque layer 300 may be located or disposed to cover the entire display area DA. The opaque layer 300 may extend to the peripheral area PPA. The opaque layer 300 may prevent light incident from the outside of the display apparatus and light emitted from a display element from reaching the sensor SU. The opaque layer 300 may have holes 310 passing through the opaque layer 300. The holes 310 may be transmitters through which the reflected light RL from the pixels PX passes and reaches the sensor SU. The holes 310 may be formed in a predetermined pattern according to an arrangement of the pixels PX.

The opaque layer 300 may include a light-shielding material. The opaque layer 300 may include a light-shielding metal. For example, the opaque layer 300 may include at least one of aluminum (Al), copper (Cu), silver (Ag), molybdenum (Mo), chromium (Cr), tungsten (W), titanium (Ti), and an alloy thereof and may have a single or multi-layer structure. In an embodiment, the opaque layer 300 may have a single-layer structure including Mo. In another embodiment, the opaque layer 300 may have a three-layer structure including a first layer formed of Ti, a second layer formed of Al, and a third layer formed of Ti, which may be sequentially stacked on the buffer layer 101. The opaque layer 300 may include any other suitable material as would be appreciated and understood by one of ordinary skill in the art.

A transparent insulating material may be located or disposed in the holes 310 of the opaque layer 300. In an embodiment, the holes 310 of the opaque layer 300 may be filled with a first insulating layer 111 and/or a second insulating layer 112. In another embodiment, the holes 310 of the opaque layer 300 may be filled with a transparent insulating material separate from the first insulating layer 111 and/or the second insulating layer 112.

Although the opaque layer 300 may be located or disposed on the buffer layer 101 in FIG. 5, the disclosure is not limited thereto. For example, the opaque layer 300 may be located or disposed between layers of the substrate 100 or between the substrate 100 and the buffer layer 101, or may have a multi-layer structure including layers located or disposed at different positions.

Referring back to FIG. 5, the first insulating layer 111 may be located or disposed on the opaque layer 300. The first insulating layer 111 may include an inorganic material, such as oxide or nitride, or an organic material, or a combination of an inorganic material and an organic material, and may have a single or multi-layer structure including an inorganic material and an organic material.

The pixel PX including a pixel circuit PC including a thin-film transistor (TFT) 430 and a capacitor 470 and a display element 450 connected to the pixel circuit PC may be provided on the first insulating layer 111. The display element 450 may be an organic light-emitting diode (OLED).

The TFT 430 may include a semiconductor layer 431, a gate electrode 432, a source electrode 433, and a drain electrode 434. The semiconductor layer 431 may include a source region, a drain region, and a channel region between the source region and the drain region. The source electrode 433 and the drain electrode 434 may respectively contact the source region and the drain region of the semiconductor layer 431. The second insulating layer 112 may be located or disposed between the semiconductor layer 431 and the gate electrode 432. A third insulating layer 113 and a fourth insulating layer 114 may be located or disposed between the gate electrode 432 and the source electrode 433 and between the gate electrode 432 and the drain electrode 434. Each of the second insulating layer 112, the third insulating layer 113, and the fourth insulating layer 114 may include an inorganic insulating material such as silicon oxide, silicon nitride, silicon oxynitride, aluminum oxide, titanium oxide, tantalum oxide, or hafnium oxide. Each of the second insulating layer 112, the third insulating layer 113, and the fourth insulating layer 114 including the inorganic insulating material may have a single or multi-layer structure including the above material or materials.

The capacitor 470 may include a lower electrode 471 located or disposed on the same layer as the gate electrode 432 of the TFT 430 and an upper electrode 472 covering the lower electrode 471.

The lower electrode 471 of the capacitor 470 may be integrally formed as a single body with the gate electrode 432 of the TFT 430. For example, the gate electrode 432 of the TFT 430 may function as the lower electrode 471 of the capacitor 470. The lower electrode 471 of the capacitor 470 may overlap the upper electrode 472 with the third insulating layer 113 therebetween. For example, the third insulating layer 113 may function as a dielectric layer of the capacitor 470.

Although the capacitor 470 overlaps the TFT 430 in FIG. 5, the disclosure is not limited thereto. Various modifications may be made; for example, the capacitor 470 may be located or disposed not to overlap the TFT 430. The fourth insulating layer 114 may be located or disposed on the capacitor 470.

A fifth insulating layer 115 covering the TFT 430 may include a planarization insulating layer and may have a single or multi-layer structure including an organic insulating material. The fifth insulating layer 115 may include an organic insulating material such as a general-purpose polymer (e.g., polymethyl methacrylate (PMMA) or polystyrene (PS)), a polymer derivative having a phenol-based group, an acrylic polymer, an imide-based polymer, an aryl ether-based polymer, an amide-based polymer, a fluorinated polymer, a p-xylene-based polymer, a vinyl alcohol-based polymer, or a blend thereof. In an embodiment, the fifth insulating layer 115 may include polyimide (PI). In an embodiment, the fifth insulating layer 115 may have a single or multi-layer structure including an inorganic insulating material.

A pixel electrode 451 may be electrically connected to the source electrode 433 or the drain electrode 434 of the TFT 430. The pixel electrode 451 may include a reflective film including a reflective conductive material such as silver (Ag), magnesium (Mg), aluminum (Al), platinum (Pt), lead (Pb), gold (Au), nickel (Ni), neodymium (Nd), iridium (Ir), chromium (Cr), or a compound thereof. In an embodiment, the pixel electrode 451 may include a transparent conductive film including at least one transparent conductive oxide selected from the group consisting of indium tin oxide (ITO), indium zinc oxide (IZO), zinc oxide (ZnO), indium oxide ($In_2O_3$), indium gallium oxide (IGO), and aluminum zinc oxide (AZO). In an embodiment, the pixel electrode 451 may have a structure in which the reflective film and the transparent conductive film may be stacked.

An edge of the pixel electrode 451 may be covered by a sixth insulating layer 116 located or disposed on the fifth insulating layer 115. For example, the sixth insulating layer 116 may be a pixel-defining layer that defines an emission area by having an opening OP through which a part of the pixel electrode 451 may be exposed. The opening OP of the sixth insulating layer 116, where an emission layer is located or disposed, may correspond to the emission area of the pixel PX. The sixth insulating layer 116 may include an organic insulating film. The sixth insulating layer 116 may include a polyacrylic compound, a PI-based compound, a fluorocarbon compound such as Teflon™, or a benzocyclobutene compound.

An intermediate layer 452 may be located or disposed on the pixel electrode 451, and may include at least an emission layer (EML). In an embodiment, the intermediate layer 452 may include at least one EML and may include one or more functional layers from among a hole injection layer (HIL), a hole transport layer (HTL), an electron transport layer (ETL), and an electron injection layer (EIL). The EML may be a red EML, a green EML, or a blue EML. The EML may have a multi-layer structure in which a red EML, a green EML, and a blue EML may be stacked to emit white light, or may have a single-layer structure including a red light-emitting material, a green light-emitting material, and a blue light-emitting material. The functional layers may include a layer integrally formed over pixel electrodes 451, or may include a layer patterned to correspond to each of the pixel electrodes 451.

A counter electrode 453 may be located or disposed on the intermediate layer 452 and may be formed of any of various conductive materials. For example, the counter electrode 453 may include a transflective film including at least one selected from the group consisting of lithium (Li), calcium (Ca), lithium fluoride (LiF), Al, Mg, and Ag or may include a transparent metal oxide such as ITO, IZO, or ZnO, and may have a single or multi-layer structure.

An encapsulation layer 410 may be located or disposed on the counter electrode 453, and the display apparatus may be protected from a foreign material, moisture, or the like. In an embodiment, the encapsulation layer 410 may include an encapsulation substrate attached to the substrate 100. The encapsulation substrate may be formed of any of various materials such as a glass material, a metal material, or a plastic material. In an embodiment, the encapsulation layer 410 may include a thin-film encapsulation layer including at least one organic encapsulation layer and at least one inorganic encapsulation layer.

The functional layer 500 may be located or disposed on the encapsulation layer 410. The functional layer 500 may include an input sensing member for sensing a touch input, an anti-reflection member including a polarizer, a retarder, a color filter, or a black matrix, and a transparent window.

A sensor layer 200 may be located or disposed on a rear surface of the substrate 100. The sensor layer 200 may be formed as a unit separate from the pixel layer 400 and may be coupled to the rear surface of the substrate 100.

The sensor layer 200 may include the sensor SU provided on a base layer 201.

The base layer 201 may correspond to a shape of the substrate 100 of the display panel 10 and may be provided to have substantially the same shape as that of the substrate 100. The base layer 201 may include an insulating substrate or an insulating film formed of an insulating material such as a polymer resin, a metal material, or a glass material.

A buffer layer 210 may be provided on the base layer 201. The buffer layer 210 may include an inorganic material, such as silicon nitride or silicon oxide, or an organic material, or a combination of an inorganic material and an organic material, and may have a single or multi-layer structure including an inorganic material and an organic material. The buffer layer 210 may be omitted.

The sensor SU including a TFT 230, a photodiode 250 that is a light-receiving device, and a capacitor 270 may be provided on the buffer layer 210. The sensor SU may be an optical sensor that senses biometric information by receiving the reflected light RL obtained when the light L emitted from the display element 450 of the pixel PX is reflected by the object OB.

The TFT 230 may include a semiconductor layer 231, a gate electrode 232, a source electrode 233, and a drain electrode 234. The semiconductor layer 231 may include a source region, a drain region, and a channel region between the source region and the drain region. The source electrode 233 and the drain electrode 234 may respectively contact the source region and the drain region of the semiconductor layer 231. A seventh insulating layer 211 may be located or disposed between the semiconductor layer 231 and the gate electrode 232. An eighth insulating layer 212 and a ninth insulating layer 213 may be located or disposed between the gate electrode 232 and the source electrode 233 and between the gate electrode 232 and the drain electrode 234. Each of the seventh insulating layer 211, the eighth insulating layer 212, and the ninth insulating layer 213 may have a single or multi-layer structure including an inorganic insulating material.

The photodiode 250 may obtain biometric information by sensing the reflected light RL reflected from the object OB and passing through the holes 310 of the opaque layer 300. The photodiode 250 may include a first electrode 251, a semiconductor layer 252, a second electrode 253, and a bias electrode 254. The first electrode 251 may be electrically connected to the drain electrode 234 of the TFT 230. The second electrode 253 may include a transparent electrode. The bias electrode 254 may be connected to the second electrode 253 and may be electrically connected to the second electrode 253 through a contact hole in the ninth insulating layer 213 covering the second electrode 253.

The capacitor 270 may include a lower electrode 271 located or disposed on the same layer as the gate electrode 232 of the TFT 230 and an upper electrode 272 located or disposed on the same layer as the first electrode 251 of the photodiode 250.

A tenth insulating layer 214 as a planarization insulating layer covering the TFT 230 and the photodiode 250 may have a single or multi-layer structure including an organic insulating material. In an embodiment, the tenth insulating layer 214 may have a single or multi-layer structure including an inorganic insulating material. An adhesive layer (not illustrated) for attaching the sensor layer 200 to the substrate 100 may be provided between the tenth insulating layer 214 and the rear surface of the substrate 100.

Figure 6A:
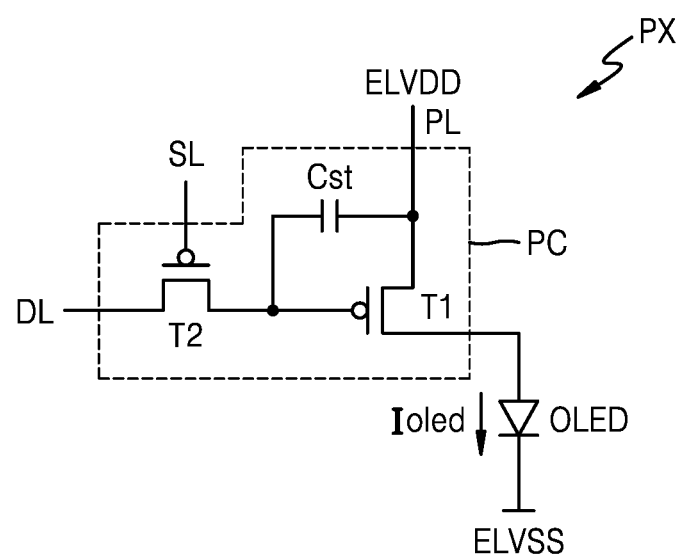
FIGS. 6A and 6B are equivalent circuit diagrams illustrating one pixel of a display panel according to an embodiment of the disclosure.
Figure 6B:
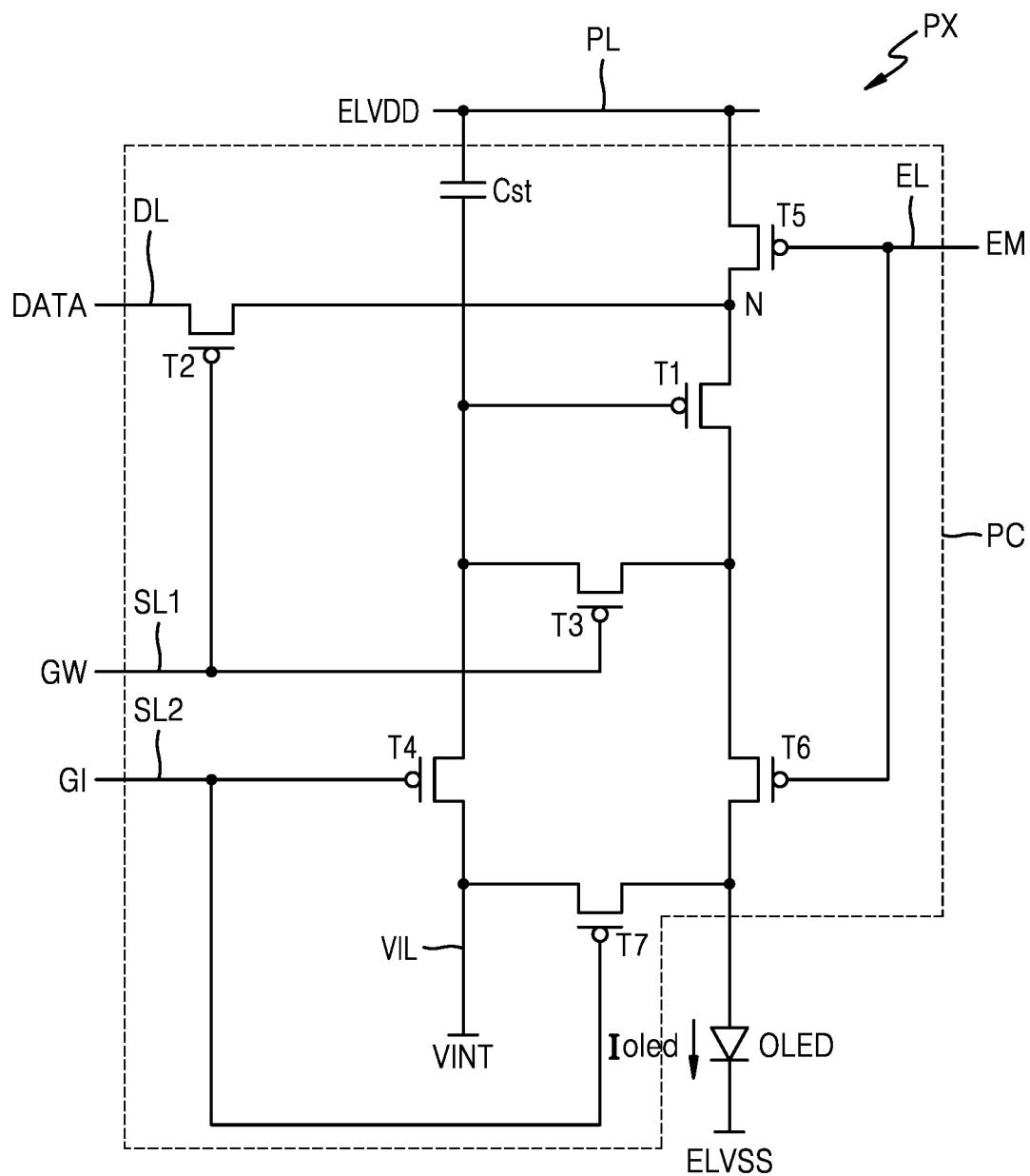

FIGS. 6A and 6B are schematic diagrams of equivalent circuits of a pixel illustrating one pixel of a display panel according to an embodiment of the disclosure.

Referring to FIG. 6A, the pixel PX includes the pixel circuit PC and the OLED that is a display element connected to the pixel circuit PC. The pixel circuit PC may include a first transistor T1, a second transistor T2, and a capacitor Cst. Each pixel PX may emit red, green, blue, or white light from the OLED.

The second transistor T2 that may be a switching transistor may be connected to the scan line SL and the data line DL and may transmit a data signal input from the data line DL to the first transistor T1 according to a switching voltage input from the scan line SL. The capacitor Cst may be connected to the second transistor T2 and a power supply voltage line PL and may store a voltage corresponding to a difference between a voltage corresponding to the data signal received from the second transistor T2 and a first power supply voltage ELVDD supplied to the power supply voltage line PL. The power supply voltage line PL may be apart from the scan line SL or the data line DL to be parallel to the scan line SL or the data line DL.

The first transistor T1 that may be a driving transistor may be connected to the power supply voltage line PL and the capacitor Cst and may control driving current $I_{oled}$ flowing through the OLED from the power supply voltage line PL according to a value of the voltage stored in the capacitor Cst. The OLED may emit light having a predetermined luminance due to the driving current $I_{oled}$. A counter electrode (e.g., a cathode) of the OLED may receive a second power supply voltage ELVSS.

Although the pixel circuit PC includes two transistors and one capacitor in FIG. 6A, the disclosure is not limited thereto. The number of transistors and the number of capacitors may be modified in various ways according to a design of the pixel circuit PC.

Referring to FIG. 6B, although signal lines (e.g., SL1, SL2, EL, and DL), an initialization voltage line VIL, and the power supply voltage line PL are provided per pixel PX, the disclosure is not limited thereto. In an embodiment, at least one of the signal lines (e.g., SL1, SL2, EL, and DL), the initialization voltage line VIL, and/or the power supply voltage line PL may be shared by neighboring pixels.

The signal lines may include a first scan line SL1 that transmits a first scan signal GW, a second scan line SL2 that transmits a second scan signal GI, an emission control line EL that transmits an emission control signal EM, and the data line DL that intersects the first scan line SL1 and transmits a data signal DATA. The second scan line SL2 may be connected to the first scan line SL1 of a next row or a previous row, and the second scan signal GI may be the first scan signal GW of the next row or the previous row.

The power supply voltage line PL may transmit the first power supply voltage ELVDD to the first transistor T1, and the initialization voltage line VIL may transmit an initialization voltage VINT for initializing a pixel electrode and the first transistor T1 to the pixel PX.

The first scan line SL1, the second scan line SL2, the emission control line EL, and the initialization voltage line VIL may extend in the first direction D1 and may be spaced apart from one another in each row. The data line DL and the power supply voltage line PL may extend in the second direction D2 and may be spaced apart from each other in each column.

The pixel circuit PC of the pixel PX may include the first through seventh transistors T1 through T7 and the capacitor Cst.

The first transistor T1 may be connected through the fifth transistor T5 to the power supply voltage line PL and may be electrically connected through the sixth transistor T6 to the OLED. The first transistor T1 may function as a driving transistor, and may receive the data signal DATA according to a switching operation of the second transistor T2 and supplies the driving current $I_{oled}$ to the OLED.

The second transistor T2 may be connected to the first scan line SL1 and the data line DL, may be turned on by the first scan signal GW received through the first scan line SL1, and may perform a switching operation of transmitting the data signal DATA transmitted through the data line DL to a node N.

The third transistor T3 may be connected through the sixth transistor T6 to the OLED. The third transistor T3 may be turned on by the first scan signal GW received through the first scan line SL1 and diode-connects the first transistor T1.

The fourth transistor T4 may be turned on by the second scan signal GI received through the second scan line SL2, and may transmit the initialization voltage VINT from the initialization voltage line VIL to a gate electrode of the first transistor T1 and initializes a gate voltage of the first transistor T1.

The fifth transistor T5 and the sixth transistor T6 may be simultaneously turned on by the emission control signal EM received through the emission control line EL and form a current path through which the driving current $I_{oled}$ may flow from the power supply voltage line PL to the OLED.

The seventh transistor T7 may be turned on by the second scan signal GI received through the second scan line SL2, and may transmit the initialization voltage VINT from the initialization voltage line VIL to the OLED and may initialize the OLED. The seventh transistor T7 may be omitted.

Although the fourth transistor T4 and the seventh transistor T7 may be connected to the second scan line SL2 in FIG. 6B, the disclosure is not limited thereto. In another embodiment, the fourth transistor T4 may be connected to the second scan line SL2, and the seventh transistor T7 may be connected to a separate wiring and may operate according to a signal transmitted to the wiring.

The capacitor Cst may be connected to the power supply voltage line PL and the gate electrode of the first transistor T1, and may store or maintain a voltage corresponding to a difference between voltages of both terminals thereof to maintain a voltage applied to the gate electrode of the first transistor T1.

A pixel electrode may receive driving current $I_{oled}$ from the first transistor T1 and may function as a first electrode of the OLED. A common electrode may receive the second power supply voltage ELVSS and may function as a second electrode of the OLED.

The transistors, the capacitor Cst, and the OLED of FIGS. 6A and 6B may be respectively implemented as the TFT 430, the capacitor 470, and the display element 450 of FIG. 5.

Although the OLED is a display element in FIGS. 6A and 6B, an embodiment of the disclosure is not limited thereto. Examples of the display element in FIGS. 6A and 6B may include a light-emitting diode (LED), a mini-LED, a nano-light-emitting diode (NED), and a quantum dot (QD)-LED.

FIGS. 7A through 9B are views illustrating an arrangement of pixel circuits according to an embodiment of the disclosure.

Pixels located or disposed in the display area DA of the substrate 100 may include a first pixel PX1 that emits light of a first color, a second pixel PX2 that emits light of a second color, and a third pixel PX3 that emits light of a third color. The first pixel PX1, the second pixel PX2, and the third pixel PX3 may be repeatedly arranged in a predetermined pattern in a first direction and a second direction. In an embodiment, the first pixel PX1 may be a red pixel, the second pixel PX2 may be a green pixel, and the third pixel PX3 may be a blue pixel. In another embodiment, the first pixel PX1 may be a red pixel, the second pixel PX2 may be a blue pixel, and the third pixel PX3 may be a green pixel.

Each of the first pixel PX1, the second pixel PX2, and the third pixel PX3 may include the pixel circuit PC and the OLED that is a display element electrically connected to the pixel circuit PC as shown in FIGS. 6A and 6B.

The display area DA of the substrate 100 may include pixel areas PA where the pixels PX are located or disposed. The pixel areas PA may include a first pixel area PA1, a second pixel area PA2, and a third pixel area PA3. A first pixel circuit PC1 of the first pixel PX1 may be located or disposed in the first pixel area PA1. A second pixel circuit PC2 of the second pixel PX2 may be located or disposed in the second pixel area PA2. A third pixel circuit PC3 of the third pixel PX3 may be located or disposed in the third pixel area PA3.

Figure 7A:
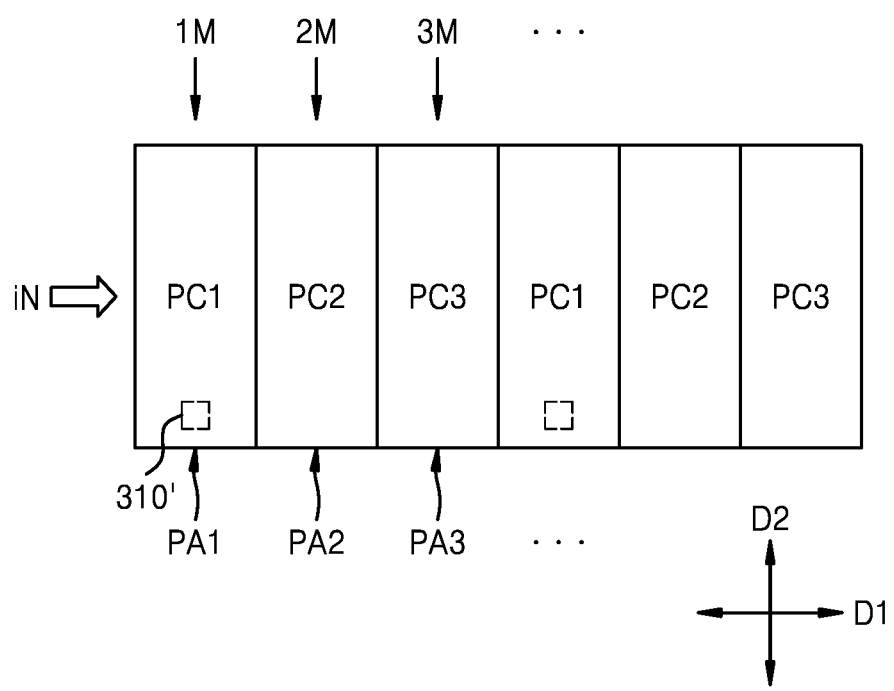
FIGS. 7A through 9B are views illustrating an arrangement of pixel circuits according to an embodiment of the disclosure.

In an embodiment, as shown in FIG. 7A, in a row iN, the first pixel area PA1 of a first column 1M, the second pixel area PA2 of a second column 2M substantially adjacent to the first pixel area PA1, and the third pixel area PA3 of a third column 3M substantially adjacent to the second pixel area PA2 may be repeatedly arranged in the first direction D1 that is a row direction. The first pixel circuit PC1, the second pixel circuit PC2, and the third pixel circuit PC3 may be repeatedly arranged in the first through third pixel areas PA1, PA2, and PA3.

Figure 7B:
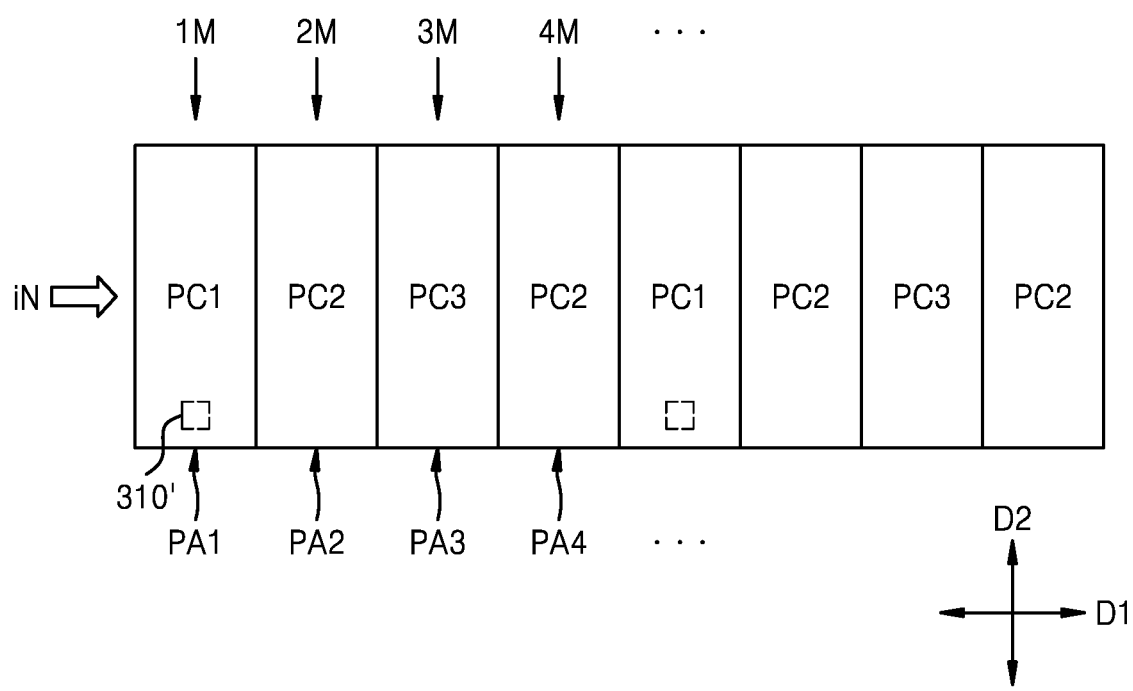

In an embodiment, as shown in FIG. 7B, in the row iN, the first pixel area PA1 of the first column 1M, the second pixel area PA2 of the second column 2M substantially adjacent to the first pixel area PA1, the third pixel area PA3 of the third column 3M substantially adjacent to the second pixel area PA2, and the second pixel area PA2 of a fourth column 4M substantially adjacent to the third pixel area PA3 may be repeatedly arranged in the first direction D1. The first pixel circuit PC1, the second pixel circuit PC2, the third pixel circuit PC3, and the second pixel circuit PC2 may be repeatedly arranged in the first through third pixel areas PA1, PA2, and PA3.

Each of the first through third pixel areas PA1, PA2, and PA3 may include at least one light-transmitting area 310'. The light-transmitting area 310' may be an area corresponding to a gap between circuit devices constituting a pixel in a pixel area and/or wirings connected to the circuit devices. For example, the light-transmitting area 310' may be an area where light-shielding elements such as the circuit devices constituting the pixel in the pixel area and/or the wirings connected to the circuit devices are not located or disposed.

In an embodiment of the disclosure, the opaque layer 300 may be located or disposed over the substrate 100 and may be located or disposed under a circuit layer including the first through third pixel circuits PC1, PC2, and PC3. The opaque layer 300 may have holes 310. Positions of the holes 310 of the opaque layer 300 may correspond to positions of the light-transmitting areas 310' of pixel areas where a pixel that emits light of a specific color is located or disposed from among the first through third pixel areas PA1, PA2, and PA3. The holes 310 of the opaque layer 300 may overlap the light-transmitting areas 310' of pixel areas where a pixel that emits light of a specific color is located or disposed, and may not overlap the light-transmitting areas 310' of remaining pixel areas. That is, the opaque layer 300 may have a hole pattern corresponding to an arrangement pattern of pixel areas where a pixel that emits light of a specific color is located or disposed. For example, the holes 310 of the opaque layer 300 may be repeatedly formed in a predetermined pattern and at regular intervals in the first direction D1 and the second direction D2 in the display area DA.

Figure 8A:
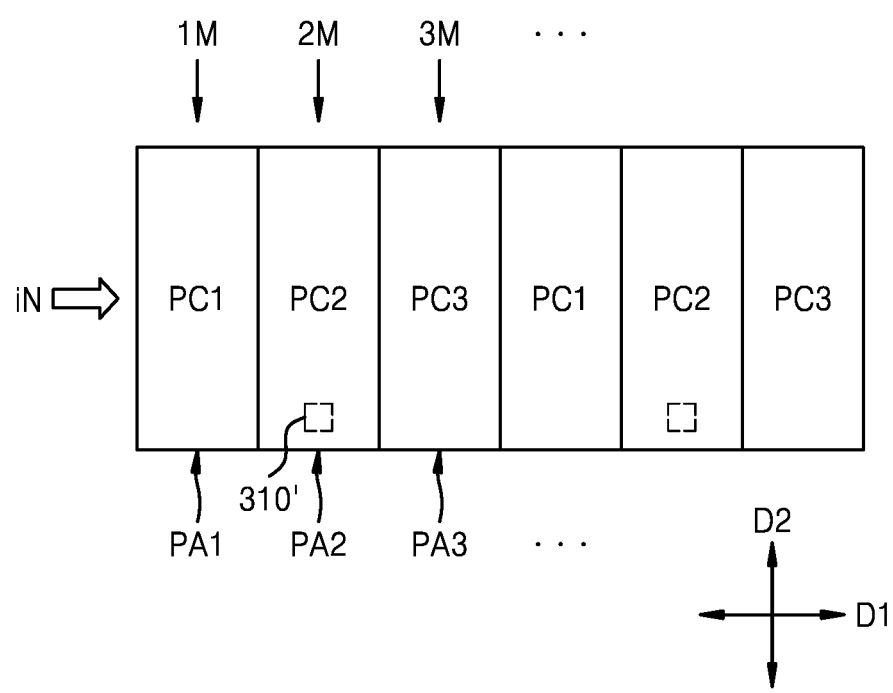
Figure 8B:
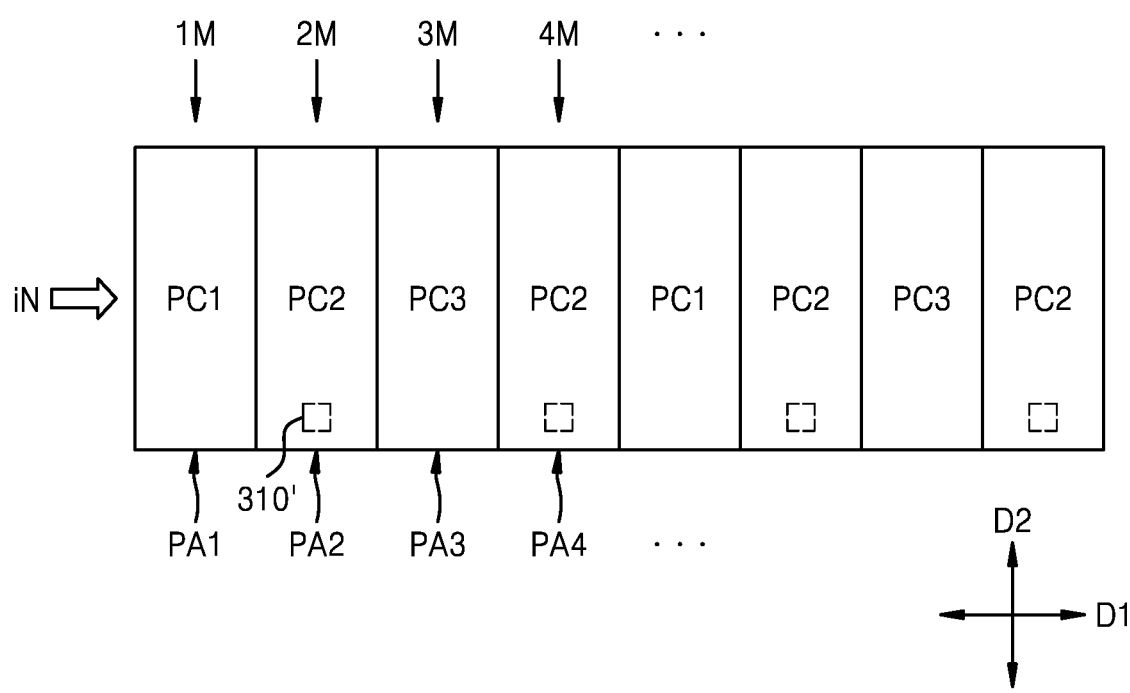
Figure 9A:
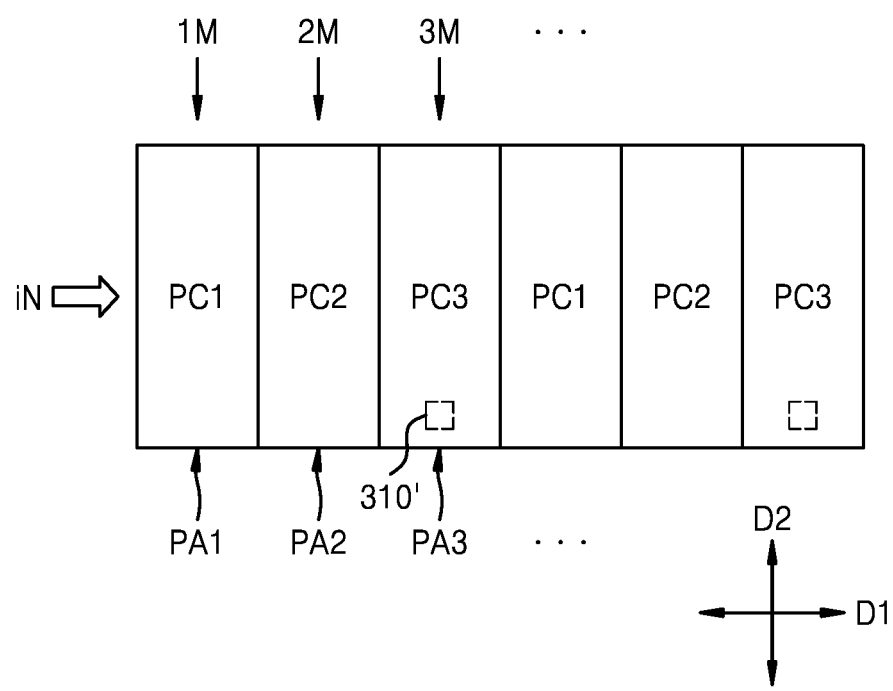
Figure 9B:
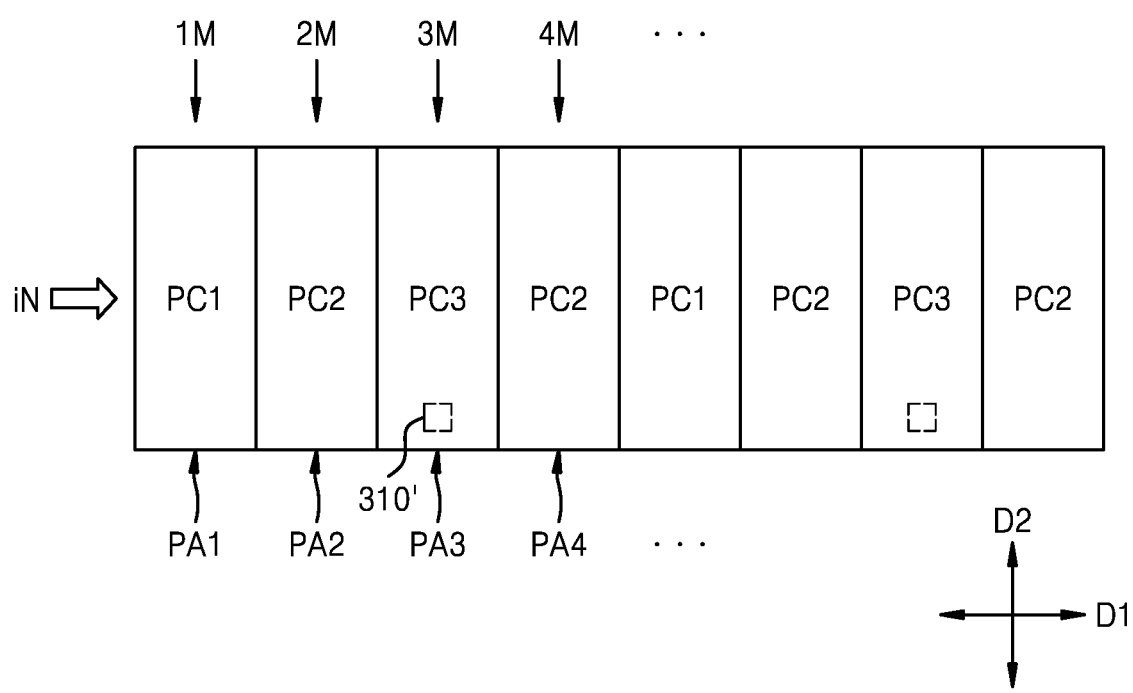

In an embodiment, as shown in FIGS. 7A and 7B, the opaque layer 300 may have the holes 310 at positions corresponding to the light-transmitting areas 310' of the first pixel areas PA1. In another embodiment, as shown in FIGS. 8A and 8B, the opaque layer 300 may have the holes 310 at positions corresponding to the light-transmitting areas 310' of the second pixel areas PA2. In another embodiment, as shown in FIGS. 9A and 9B, the opaque layer 300 may have the holes 310 at positions corresponding to the light-transmitting areas 310' of the third pixel areas PA3.

When the holes 310 of the opaque layer 300 are formed at regular intervals, the holes 310 of the opaque layer 300 may correspond to light-transmitting areas of color pixels that emit light of different colors. For example, some of the holes 310 of the opaque layer 300 may correspond to light-transmitting areas of the first pixel areas PA1, others of the holes 310 may correspond to light-transmitting areas of the second pixel areas PA2, and others of the holes 310 may correspond to light-transmitting areas of the third pixel areas PA3. A luminance deviation and a color deviation may occur between a pixel having a light-transmitting area corresponding to the hole 310 and adjacent pixels having light-transmitting areas not corresponding to the hole 310. This is because, due to the hole 310 of the opaque layer 300, the influence of the opaque layer 300 on an electrode layer connected to TFTs, for example, a driving TFT, may be changed.

According to an embodiment of the disclosure, however, because the holes 310 of the opaque layer 300 are formed at regular intervals and are formed at positions corresponding to light-transmitting areas of specific or predetermined pixel areas, a luminance deviation and a color deviation between pixels may be prevented or minimized.

Each of display elements of the first through third pixels PX1, PX2, and PX3 may be located or disposed over a pixel circuit. The display element may be directly located or disposed on the pixel circuit to overlap the pixel circuit, or may be located or disposed to partially overlap a pixel circuit of another pixel that may be offset from the pixel circuit and may be located or disposed in an adjacent row or column. That is, the display element may be located or disposed in a corresponding pixel area, or a part of the display element may be located or disposed in another pixel area substantially adjacent to the corresponding pixel area.

Figure 10:
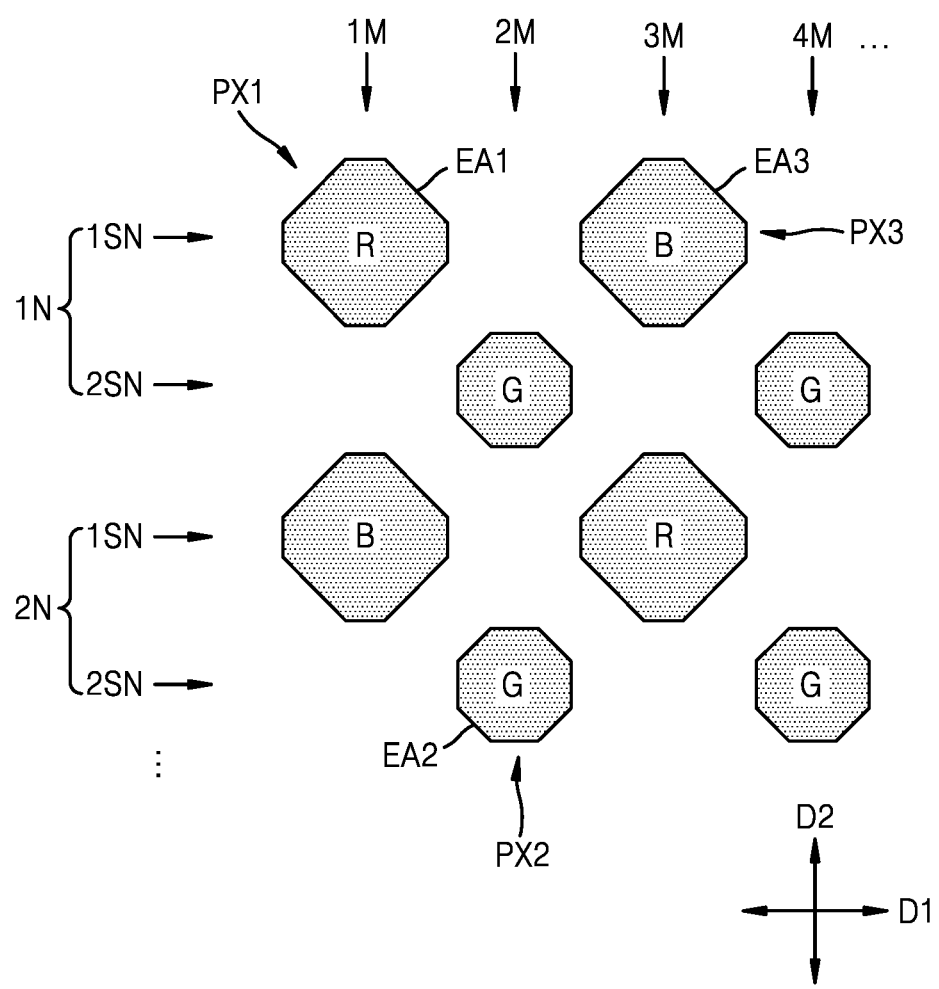
FIG. 10 is a view illustrating an arrangement of emission areas of pixels of a display apparatus according to an embodiment of the disclosure.

FIG. 10 is a view illustrating an arrangement of emission areas of pixels of a display apparatus according to an embodiment of the disclosure.

FIG. 10 illustrates an emission area of each of the first pixel PX1, the second pixel PX2, and the third pixel PX3. The emission area is an area where an emission layer (EML) of a display element is located or disposed. An opening of a pixel-defining layer or a portion of a pixel electrode exposed through the opening of the pixel-defining layer may be defined as the emission area.

The first pixel PX1 may include a first emission area EA1, the second pixel PX2 may include a second emission area EA2, and the third pixel PX3 may include a third emission area EA3.

The first emission areas EA1 of the first pixels PX1 and the third emission areas EA3 of the third pixels PX3 may be alternately arranged in the first direction D1 in a first sub-row 1SN of each of rows 1N, 2N, . . . , and the second emission areas EA2 of the second pixels PX2 may be repeatedly arranged in the first direction D1 in a second sub-row 2SN. The first emission areas EA1 of the first pixels PX1, the second emission areas EA2 of the second pixels PX2, the third emission areas EA3 of the third pixels PX3, and the second emission areas EA2 of the second pixels PX2 may be repeatedly arranged in a zigzag fashion or pattern in each of the rows 1N, 2N, . . . Such fashion or pattern may be other arrangement as would be appreciated and understood by those of ordinary skill in the art.

In an odd column, the first emission areas EA1 of the first pixels PX1 and the third emission areas EA3 of the third pixels PX3 may be alternately arranged in the second direction D2. In an even column, the second emission areas EA2 of the second pixels PX2 may be repeatedly arranged in the second direction D2. For example, in the first column 1M, the first emission areas EA1 of the first pixels PX1 and the third emission areas EA3 of the third pixels PX3 may be alternately arranged in the second direction D2. In the second column 2M substantially adjacent to the first column 1M, the second emission areas EA2 of the second pixels PX2 may be repeatedly arranged in the second direction D2. In the third column 3M substantially adjacent to the second column 2M, the third emission areas EA3 of the third pixels PX3 and the first emission areas EA1 of the first pixels PX1 may be alternately arranged in the second direction D2 in the opposite manner to that of the first column 1M.

The first emission area EA1 of the first pixel PX1, the second emission area EA2 of the second pixel PX2, and the third emission area EA3 of the third pixel PX3 may have different sizes. In an embodiment, the third emission area EA3 of the third pixel PX3 may have a size greater than that of the first emission area EA1 of the first pixel PX1. The third emission area EA3 of the third pixel PX3 may have a size greater than that of the second emission area EA2 of the second pixel PX2. The first emission area EA1 of the first pixel PX1 may have a size greater than that of the second emission area EA2 of the second pixel PX2. In an embodiment, the third emission area EA3 of the third pixel PX3 may have a size that is the same as or similar to that of the first emission area EA1 of the first pixel PX1. The disclosure is not limited thereto. For example, various modifications may be made; for example, the first emission area EA1 of the first pixel PX1 may be larger than each of the second emission area EA2 of the second pixel PX2 and the third emission area EA3 of the third pixel PX3.

Each of the first through third emission areas EA1, EA2, and EA3 may have a polygonal shape such as a quadrangular shape or an octagonal shape, a circular shape, or an elliptical shape, and examples of the polygonal shape may include a shape having round vertices. Other shapes as would be appreciated and understood by those of ordinary skill in the art are possible in keeping with the spirit and scope of the invention.

The first emission area EA1 of the first pixel PX1 may be located or disposed in the first pixel area PA1, or a part of the first emission area EA1 may be located or disposed in the second pixel area PA2 or the third pixel area PA3 substantially adjacent to the first pixel area PA1. The second emission area EA2 of the second pixel PX2 may be located or disposed in the second pixel area PA2, or a part of the second emission area EA2 may be located or disposed in the first pixel area PA1 or the third pixel area PA3 substantially adjacent to the second pixel area PA2. The third emission area EA3 of the third pixel PX3 may be located or disposed in the third pixel area PA3, or a part of the third emission area EA3 may be located or disposed in the first pixel area PA1 or the second pixel area PA2 substantially adjacent to the third pixel area PA3.

Figure 11:
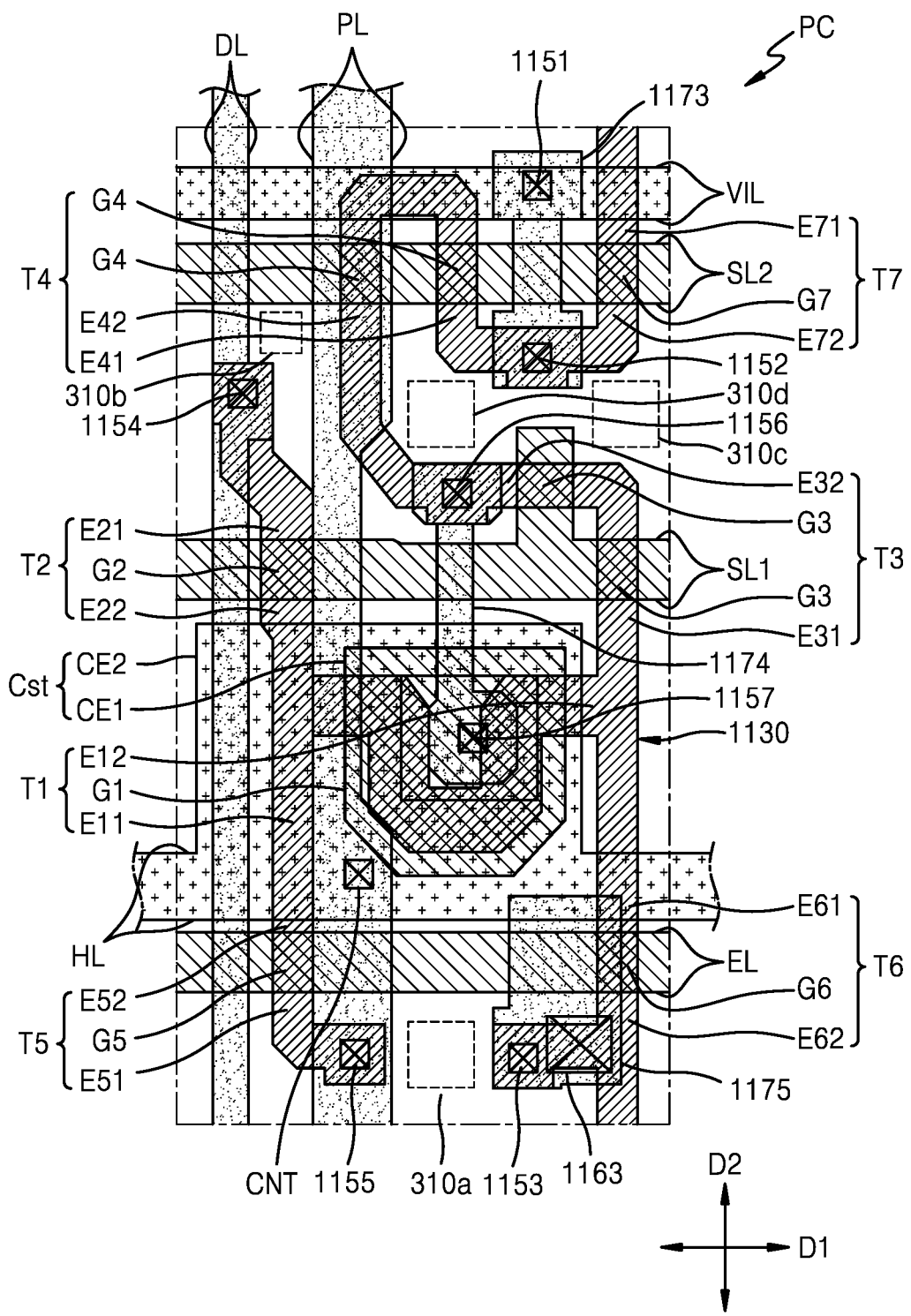
FIG. 11 is a view illustrating positions of transistors and a capacitor in a pixel circuit according to an embodiment of the disclosure.
Figure 12:
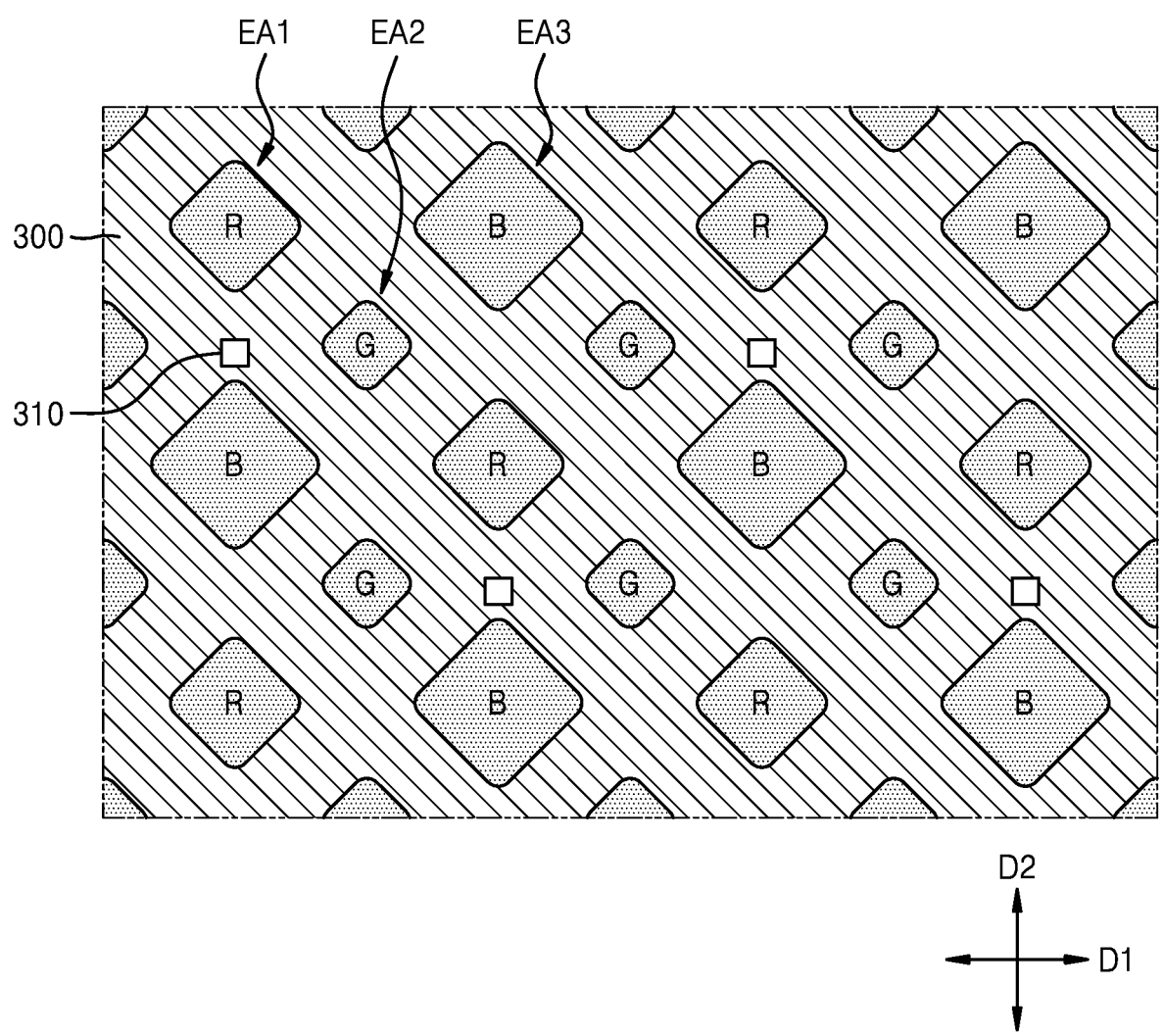
FIGS. 12 and 13 are plan views illustrating positions of holes of an opaque layer and emission areas according to an embodiment of the disclosure.
Figure 13:
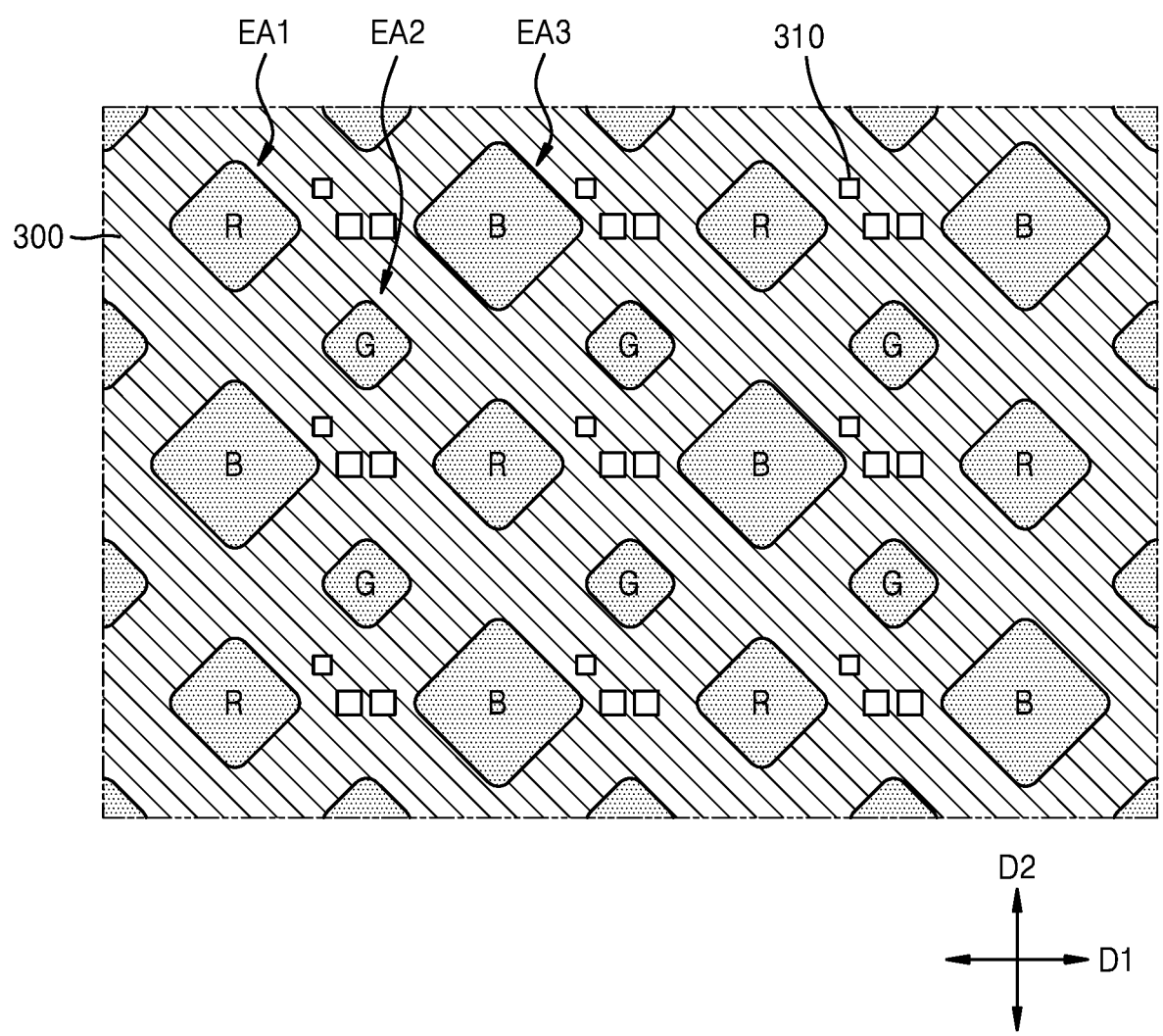

FIG. 11 is a view illustrating positions of transistors and a capacitor in a pixel circuit according to an embodiment of the disclosure. FIGS. 12 and 13 are plan views illustrating positions of holes of an opaque layer and emission areas according to an embodiment of the disclosure.

FIG. 11 is a view illustrating a pixel circuit located or disposed in a pixel area. The pixel circuit of FIG. 11 may be applied to each of the first through third pixel circuits PC1, PC2, and PC3 of the first through third pixels PX1, PX2, and PX3. For convenience of explanation, a display element over the pixel circuit is not shown in FIG. 11.

The pixel circuit PC of the pixel PX may include the first through seventh transistors T1 through T7 and the capacitor Cst. Each of the first through seventh transistors T1 through T7 may include a semiconductor layer and a gate electrode located or disposed at a position corresponding to a channel region of the semiconductor layer and insulated from the semiconductor layer. The first transistor T1, the second transistor T2, the third transistor T3, the fourth transistor T4, the fifth transistor T5, the sixth transistor T6, and the seventh transistor T7 may be arranged along a semiconductor layer 1130. That is, the semiconductor layers of the first through seventh transistors T1 through T7 may be connected to one another and may be curved in any of various shapes.

The semiconductor layer 1130 may include a channel region and a source region and a drain region at both sides of the channel region, and the source region and the drain region may respectively correspond to a source electrode and a drain electrode of a corresponding transistor.

The first transistor T1 may include a gate electrode G1 overlapping a channel region, and a first electrode E11 and a second electrode E12 at both sides of the gate electrode G1. The channel region overlapping the gate electrode G1 may have a curved shape to form a long channel in a narrow space.

The second transistor T2 may include a gate electrode G2 overlapping a channel region, and a first electrode E21 and a second electrode E22 at both sides of the channel region. The second electrode E22 may be connected to the first electrode E11 of the first transistor T1.

The third transistor T3 that may be a dual transistor may include gate electrodes G3 overlapping two channel regions, and may include a first electrode E31 and a second electrode E32 located or disposed at both sides of the channel regions. The third transistor T3 may be connected to the gate electrode G1 of the first transistor T1 through a node connection line 1174.

The fourth transistor T4 that may be a dual transistor may include gate electrodes G4 overlapping two channel regions, and a first electrode E41 and a second electrode E42 located or disposed at both sides.

The fifth transistor T5 may include a gate electrode G5 overlapping a channel region, and a first electrode E51 and a second electrode E52 located or disposed at both sides of the channel region. The second electrode E52 may be connected to the first electrode E11 of the first transistor T1.

The sixth transistor T6 may include a gate electrode G6 overlapping a channel region, and a first electrode E61 and a second electrode E62 located or disposed at both sides of the channel region. The first electrode E61 may be connected to the second electrode E12 of the first transistor T1.

The seventh transistor T7 may include a gate electrode G7 overlapping a channel region, and a first electrode E71 and a second electrode E72 located or disposed at both sides of the channel region.

The first scan line SL1, the second scan line SL2, the emission control line EL, and the gate electrode G1 of the first transistor T1 may be located or disposed on the semiconductor layer 1130 with an insulating layer (or insulating layers) therebetween.

Each of the second scan line SL1, the second scan line SL2, and the emission control line EL may extend in the first direction D1. Parts of the first scan line SL1 may correspond to the gate electrode G2 of the second transistor T2 and the gate electrode G3 of the third transistor T3. Parts of the second scan line SL2 may correspond to the gate electrode G4 of the fourth transistor T4 and the gate electrode G7 of the seventh transistor T7. Parts of the emission control line EL may correspond to the gate electrode G5 of the fifth transistor T5 and the gate electrode G6 of the sixth transistor T6.

The gate electrode G1 of the first transistor T1 that may be an island electrode may be connected to the third transistor T3 through the node connection line 1174.

An electrode voltage line HL may be located or disposed on the first scan line SL1, the second scan line SL2, the emission control line EL, and the gate electrode G2 of the first transistor T1 with an insulating layer (or insulating layers) therebetween.

The electrode voltage line HL may extend in the first direction D1 to intersect the data line DL and the power supply voltage line PL. A part of the electrode voltage line HL may cover at least a part of the gate electrode G1 of the first transistor T1, and may form the capacitor Cst along with the gate electrode G1 of the first transistor T1. For example, the gate electrode G1 of the first transistor T1 may become the first electrode CE1 of the capacitor Cst, and a part of the electrode voltage line HL may become the second electrode CE2 of the capacitor Cst.

The second electrode CE2 of the capacitor Cst may be electrically connected to the power supply voltage line PL. The electrode voltage line HL may be connected to the power supply voltage line PL located or disposed on the electrode voltage line HL through a contact hole CNT. The electrode voltage line HL may have the same voltage level as that of the power supply voltage line PL. The power supply voltage line PL may be a power supply voltage line of the second direction D2, and the electrode voltage line HL may be a power supply voltage line of the first direction D1.

The initialization voltage line VIL may extend in the first direction D1. The initialization voltage line VIL may be connected to the fourth transistor T4 and the seventh transistor T7 through an initialization connection line 1173.

The initialization voltage line VIL and the electrode voltage line HL may be located or disposed on the same layer and may include the same material. Although the initialization voltage line VIL and the electrode voltage line HL may be located or disposed on the same layer in FIG. 11, in an embodiment, the initialization voltage line VIL and a pixel electrode may be located or disposed on the same layer.

The data line DL, the power supply voltage line PL, the initialization connection line 1173, and the node connection line 1174 may be located or disposed on the electrode voltage line HL with an insulating layer (or insulating layers) therebetween.

Each of the data line DL and the power supply voltage line PL may extend in the second direction D2.

The data line DL may be connected to the first electrode E12 of the second transistor T2 through a contact hole 1154. A part of the data line DL may correspond to the first electrode E12 of the second transistor T2.

The power supply voltage line PL may be connected to the electrode voltage line HL through the contact hole CNT. The power supply voltage line PL may be connected to the fifth transistor T5 through a contact hole 1155. The power supply voltage line PL may be connected to the second electrode E52 of the fifth transistor T5 through the contact hole 1155. Although the power supply voltage line PL has a single-layer structure and may be located or disposed on the same layer as the data line DL in FIG. 11, in an embodiment, the power supply voltage line PL may have a two-layer structure including a lower power supply voltage line located or disposed on the same layer as the data line DL and an upper power supply voltage line located or disposed over the lower power supply voltage line. An insulating layer (or insulating layers) may be located or disposed between the lower power supply voltage line and the upper power supply voltage line. For example, an insulating layer (or insulating layers) may be located or disposed between the upper power supply voltage line and the pixel electrode.

One end of the initialization connection line 1173 may be connected to the fourth transistor T4 and the seventh transistor T7 through a contact hole 1152, and the other end of the initialization connection line 1173 may be connected to the initialization voltage line VIL through a contact hole 1151.

One end of the node connection line 1174 may be connected to the second electrode E32 of the third transistor T3 through a contact hole 1156, and the other end of the node connection line 1174 may be connected to the gate electrode G1 of the first transistor T1 through a contact hole 1157.

The pixel electrode 451 of the display element 450 (see FIG. 5) may be located or disposed on the data line DL, the power supply voltage line PL, the initialization connection line 1173, and the node connection line 1174 with an insulating layer (or insulating layers) therebetween. The pixel electrode 451 may be connected to the sixth transistor T6 and may be connected to the first transistor T1. The pixel electrode 451 may be connected to a connection metal 1175 through a contact hole 1163, and the connection metal 1175 may be connected to the second electrode E62 of the sixth transistor T6 through a contact hole 1153. The pixel electrode 451 may overlap at least one of the first through seventh transistors T1 through T7 and the capacitor Cst. The intermediate layer 452 including an EML may be located or disposed on the pixel electrode 451. As described above, an opening of a pixel-defining layer exposing a part of the pixel electrode 451 and covering an edge of the pixel electrode 451 or a portion of the pixel electrode 451 where the emission layer is located or disposed may be defined as an emission area.

In FIG. 11, the seventh transistor T7 provided in a pixel circuit of a pixel of a previous row may be electrically connected to the second scan line SL2 of a pixel of a current row. That is, the seventh transistor T7 of the pixel of the current row may be connected to the second scan line provided in a pixel circuit of a pixel of a next row. In an embodiment, the seventh transistor T7 may be connected to the second scan line SL2 provided in a pixel circuit of the pixel of the current row as shown in FIG. 6B.

In a pixel area, there may be a gap between elements of a pixel, for example, first through seventh transistors, a capacitor, and wirings (e.g., a scan line, an emission control line, an electrode voltage line, a data line, an initialization voltage line, a power supply voltage line, and connection lines). The elements of the pixel may not be located or disposed in the gap. A light-transmitting area may refer to an area having a predetermined size and allowing a sufficient amount of light to pass therethrough to a sensor in the gap. One or more light-transmitting areas may exist in the pixel area. Positions, sizes, shapes, and the number of the light-transmitting areas may be modified according to an arrangement of the transistors, the capacitor, and wirings in the pixel area. FIG. 11 illustrates first through fourth light-transmitting areas 310a, 310b, 310c, and 310d each having a predetermined size in a gap in a pixel area.

The opaque layer 300 according to an embodiment of the disclosure may have the holes 310 corresponding to light-transmitting areas in the pixel area. The holes 310 of the opaque layer 300 may overlap at least one light-transmitting area in the pixel area. The holes 310 of the opaque layer 300 may not overlap the emission area and may be apart from, or set aside from, or offset from each other. Positions, sizes, shapes, and the number of the holes 310 of the opaque layer 300 according to an embodiment of the disclosure may be determined according to positions, sizes, and the number of light-transmitting areas in the pixel area. The positions, sizes, shapes, and number of holes and light-transmitting areas are not limited to the illustrations of the figures but may include any positions, sizes, shapes, and numbers as would be appreciated and understood by those of ordinary skill in the art.

In an embodiment, the opaque layer 300 may have the holes 310 corresponding to a position of one light-transmitting area of each of pixels that emits light of a specific color. For example, as shown in FIG. 12, the opaque layer 300 may have the holes 310 overlapping the first light-transmitting areas 310a of the first pixel areas PA1, or overlapping the first light-transmitting areas 310a of only the first pixel areas PA1. The holes 310 may be located or disposed in a non-emission area around the first through third emission areas EA1, EA2, and EA3, and may not overlap, or are offset from, the first through third emission areas EA1, EA2, and EA3. The opaque layer 300 may have the holes 310 arranged in a predetermined pattern at regular intervals to correspond to the first light-transmitting areas 310a of the first pixel areas PA1.

In an embodiment, the opaque layer 300 may have the holes 310 corresponding to positions of light-transmitting areas of pixels that emit light of a specific color. For example, as shown in FIG. 13, the opaque layer 300 may have the holes 310 overlapping the second through fourth light-transmitting areas 310b, 310c, and 310d of the second pixel areas PA2. In this and other examples, the holes 310 may overlap the second through fourth light-transmitting areas 310b, 310c, and 310d of only the second pixel areas PA2. The holes 310 may be located or disposed in a non-emission area around the first through third emission areas EA1, EA2, and EA3 and may not overlap the first through third emission areas EA1, EA2, and EA3. The opaque layer 300 may have the holes 310 arranged in a predetermined pattern at regular intervals to correspond to the second through fourth light-transmitting areas 310b, 310c, and 310d of the second pixel areas PA2.

A display apparatus according to embodiments of the disclosure may provide a fingerprint sensing function on a front surface of the display apparatus by using the sensors SU provided in the sensing area SA overlapping the display area DA. The display apparatus according to embodiments of the disclosure senses a user's fingerprint by using light emitted from the pixels PX. Accordingly, the display apparatus with a fingerprint sensor embedded therein may be realized by using the pixels PX of the sensing area SA as a light source without an external light source. Accordingly, a thickness and manufacturing costs of the display apparatus with the fingerprint sensor embedded therein may be reduced.

The display apparatus according to embodiments of the disclosure may maximize a light transmittance by locating an opaque layer having holes in a display panel and may reduce a luminance deviation and a color deviation between pixels of different colors by causing the holes of the opaque layer to correspond to light-transmitting areas of pixels of a specific color. The display apparatus according to embodiments of the disclosure may prevent a sensor layer or the like from being viewed by the user by locating the sensor layer on a rear surface of the display panel, thereby preventing image quality degradation of the display apparatus. The display apparatus according to embodiments of the disclosure may reduce noise of a sensor and ensure the reliability of the sensor by preventing light directly emitted from a display element of a pixel from being incident on the sensor due to the holes of the opaque layer located or disposed on an entire surface of the display panel and causing the sensor to react to light reflected from a human body.

The display apparatus according to embodiments of the disclosure may be an electronic apparatus such as a smartphone, a mobile phone, a navigation system, a game console, a TV, a head unit for a vehicle, a notebook computer, a laptop computer, a tablet computer, a personal medium player (PMP), or a personal digital assistant (PDA). Also, the electronic apparatus may be a flexible apparatus.

A display apparatus according to an embodiment of the disclosure may reduce a thickness and manufacturing costs by configuring a fingerprint sensor without an external light source.

While the invention has been illustrated and described with reference to the embodiments thereof, it will be apparent to those of ordinary skill in the art that various changes in form and detail may be formed thereto without departing from the spirit and scope of the invention.

What is claimed is:

1. A display apparatus comprising:
a sensor layer comprising a plurality of sensors;
a pixel layer disposed on the sensor layer and comprising a plurality of pixel areas and a plurality of pixels that emit light of a plurality of colors, each pixel comprising a pixel circuit disposed in a corresponding pixel area of the pixel areas and emits light of one of the plurality of colors; and
an opaque layer disposed between the sensor layer and the pixel layer,
wherein the opaque layer comprises holes corresponding to light-transmitting areas of pixel areas in which pixel circuits of pixels that emit light of only a specific color among the plurality of colors are disposed.

2. The display apparatus of claim 1, wherein the holes of the opaque layer are repeatedly formed in a predetermined pattern and in a predetermined direction in a display area.

3. The display apparatus of claim 1, wherein each of the pixel areas comprises at least one light-transmitting areas corresponding to a gap between wirings and circuit devices constituting the pixel circuit.

4. The display apparatus of claim 1, wherein each of the plurality of pixels comprises a pixel electrode connected to the pixel circuit,
wherein the display apparatus comprises an insulating layer comprising openings corresponding to a part of each of the plurality of pixel electrodes and covering edges of the plurality of pixel electrodes.

5. The display apparatus of claim 4, wherein the openings of the insulating layer are offset from the holes of the opaque layer.

6. The display apparatus of claim 1, wherein the pixels that emit the light of the specific color are one of red pixels, green pixels and blue pixels.

7. The display apparatus of claim 1, further comprising a substrate between the opaque layer and the sensor layer.

8. The display apparatus of claim 1, further comprising a substrate having a plurality of layers, wherein the opaque layer is disposed between the plurality of layers of the substrate.

9. The display apparatus of claim 1, wherein the opaque layer is a single- layer structure including molybdenum (Mo).

10. The display apparatus of claim 1, wherein the opaque layer is a sequentially stacked three-layer structure comprising a first layer including titanium (Ti), a second layer including aluminum (Al), and a third layer including titanium (Ti).

11. A display apparatus comprising:
a sensor layer comprising a plurality of sensors;
a pixel layer disposed on the sensor layer and comprising a plurality of pixel areas and a plurality of pixels in the pixel areas; and
an opaque layer disposed between the sensor layer and the pixel layer and comprising holes corresponding to light-transmitting areas of pixel areas in which pixels that emit light of only a specific color among a plurality of colors are disposed,
wherein the pixel layer comprises:
a circuit layer comprising pixel circuits of the plurality of pixels; and
a display element layer disposed on the circuit layer and comprising display elements of the plurality of pixels, and
wherein the opaque layer is disposed between a substrate and the circuit layer.

12. The display apparatus of claim 1, wherein
the plurality of pixels include first, second, and third pixels, including first, second, and third emission areas, respectively,
the first emission areas of the first pixels and the third emission areas of the third pixels are alternately arranged in a first direction in a first sub-row of each of rows, and
the second emission areas of the second pixels are repeatedly arranged in the first direction in a second sub-row and repeatedly arranged in a zigzag pattern.

13. The display apparatus of claim 12, wherein the holes are offset from the first emission areas, or the second emission areas, or the third emission areas.

14. A display apparatus comprising:
a substrate comprising a plurality of pixel areas in a display area;
an opaque layer disposed on the substrate; and
a plurality of pixels disposed on the opaque layer and emit light of a plurality of colors,
wherein each of the pixels comprises a pixel circuit disposed in a corresponding pixel area of the pixel areas and a pixel electrode connected to the pixel circuit, and emits light of one of the plurality of colors, and
wherein the opaque layer comprises holes corresponding to light-transmitting areas of pixel areas in which pixel circuits of pixels that emit light of only a specific color among the plurality of colors are disposed.

15. The display apparatus of claim 14, wherein each of the pixel areas comprises at least one light-transmitting areas corresponding to a gap between wirings and circuit devices constituting the pixel circuit.

16. The display apparatus of claim 14, wherein the plurality of pixels comprise first pixels that emit red light, second pixels that emit green light, and third pixels that emit blue light, and,
wherein the light of the specific color is one of the red light, green light and blue light.

17. The display apparatus of claim 14, wherein the opaque layer comprises holes respectively corresponding to light-transmitting areas of one of the first pixel areas, the second pixel areas and the third pixel areas.

18. The display apparatus of claim 14, further comprising an insulating layer on the pixel electrodes,
wherein the insulating layer comprises openings corresponding to a part of each of the pixel electrodes and being offset from the holes of the opaque layer.

19. The display apparatus of claim 14, further comprising a plurality of sensors disposed on a surface of the substrate opposite to a surface on which the plurality of pixels are disposed, and in a sensing area overlapping at least a part of the display area.

20. The display apparatus of claim 19, wherein each of the plurality of sensors overlaps at least one pixel in the sensing area.

21. The display apparatus of claim 19, wherein each of the plurality of sensors is disposed in a non-emitting area between adjacent pixels and offset from the pixels.

* * * * *